June 12, 1962  G. A. KIRK  3,039,003
METHOD AND APPARATUS FOR GRADING COTTON AND OTHER MATERIALS
Filed Nov. 3, 1960  12 Sheets-Sheet 1

INVENTOR
GEORGE A. KIRK
BY
Mason, Finnigan, Durham & Pino
ATTORNEY

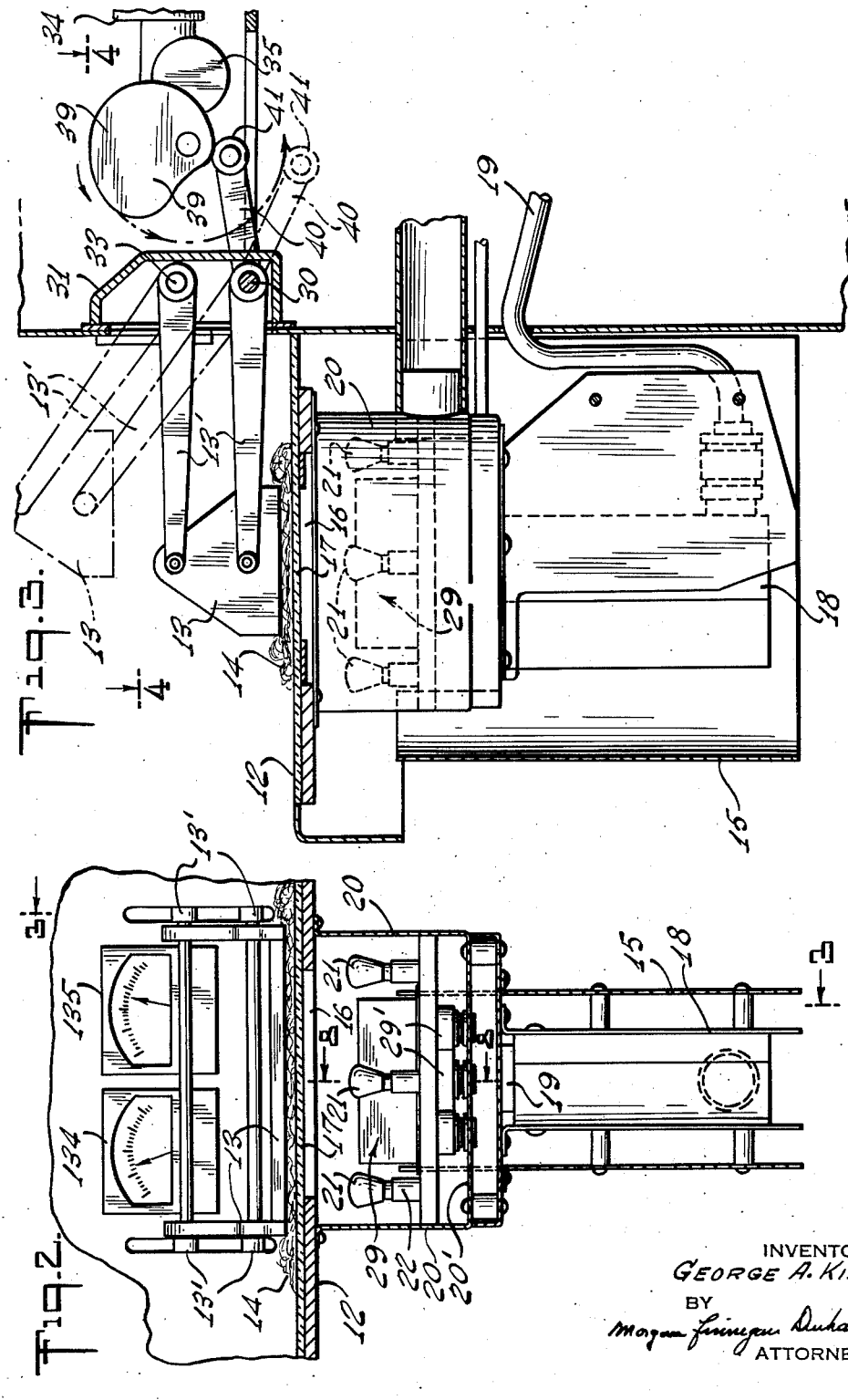

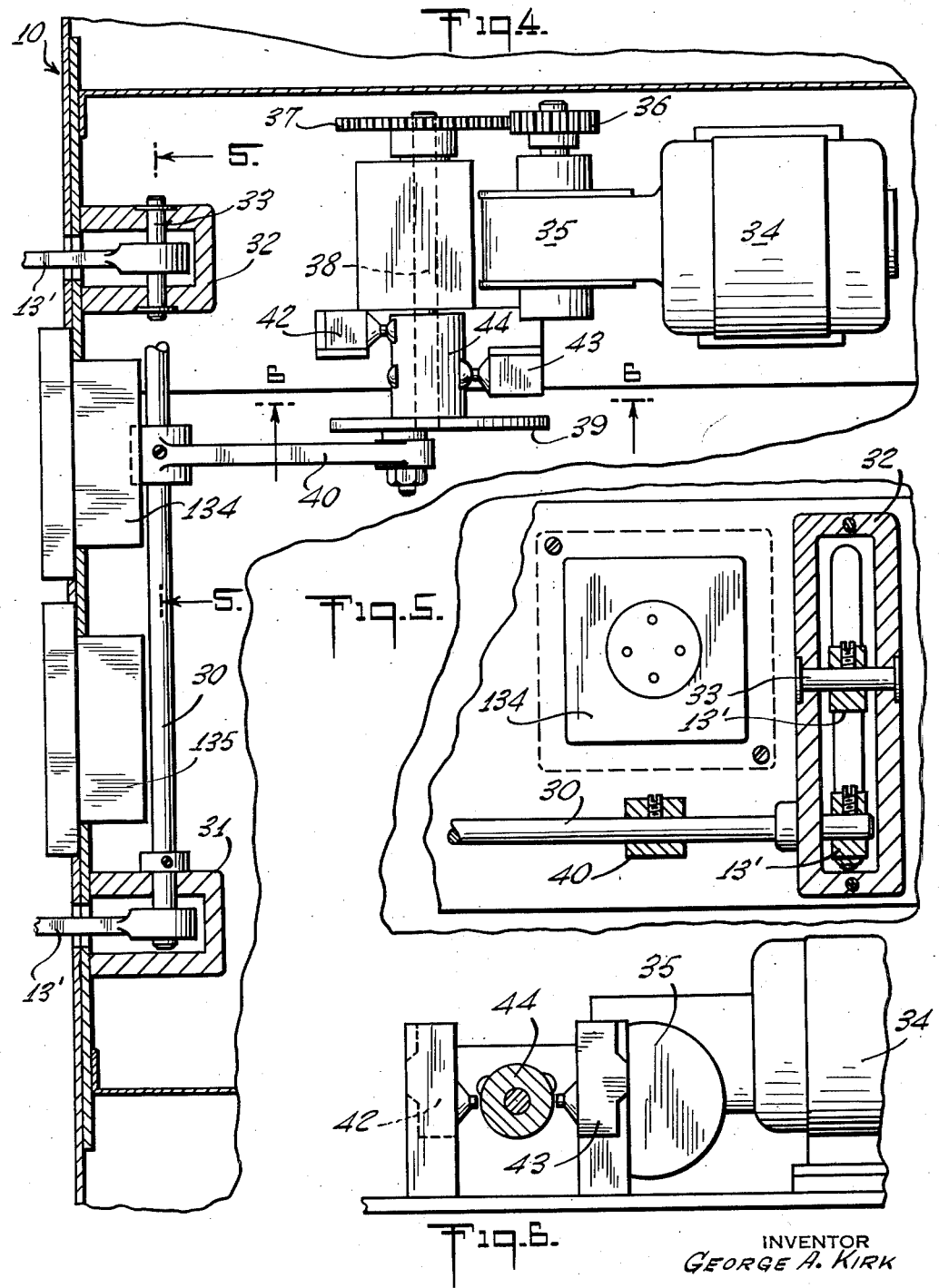

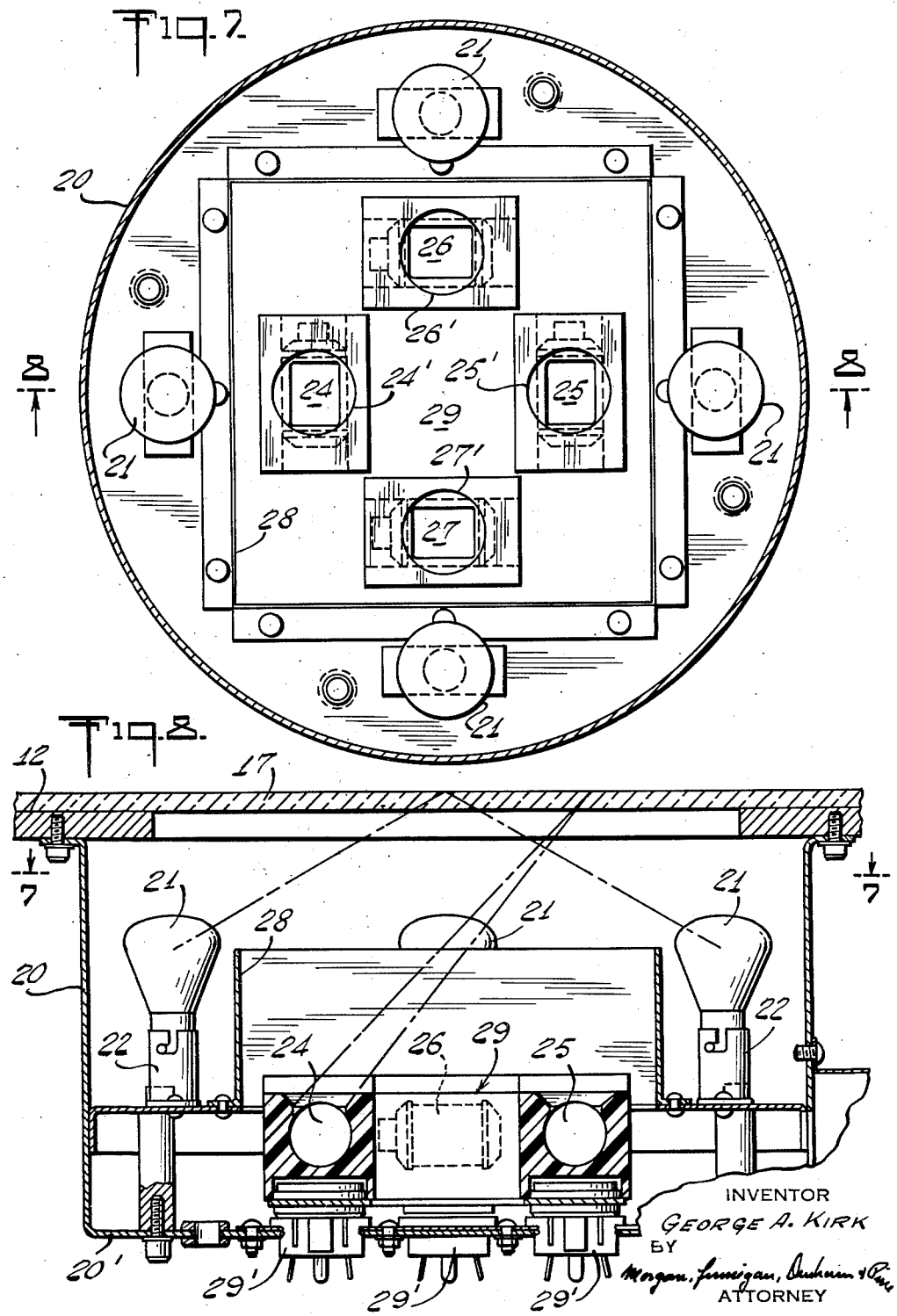

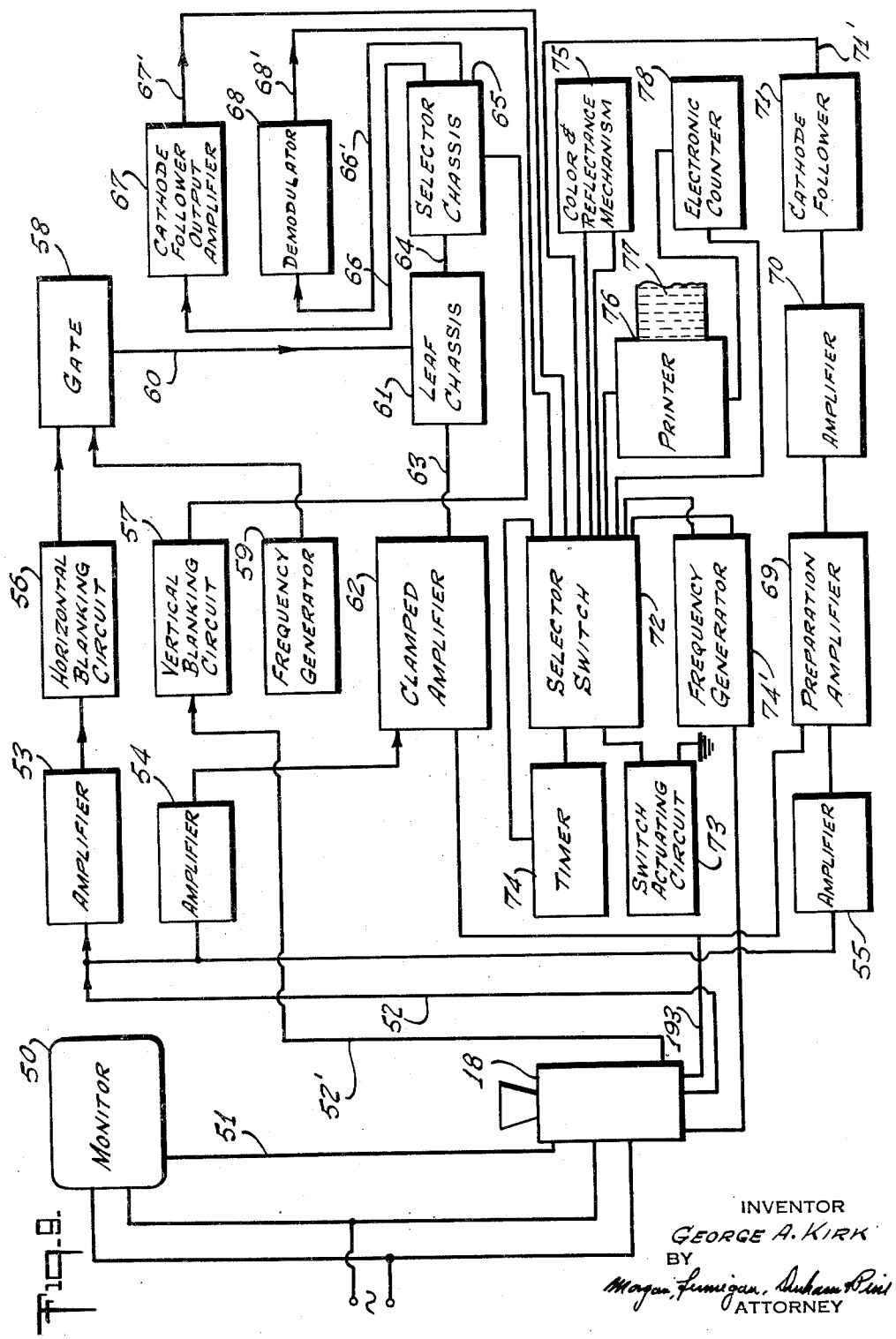

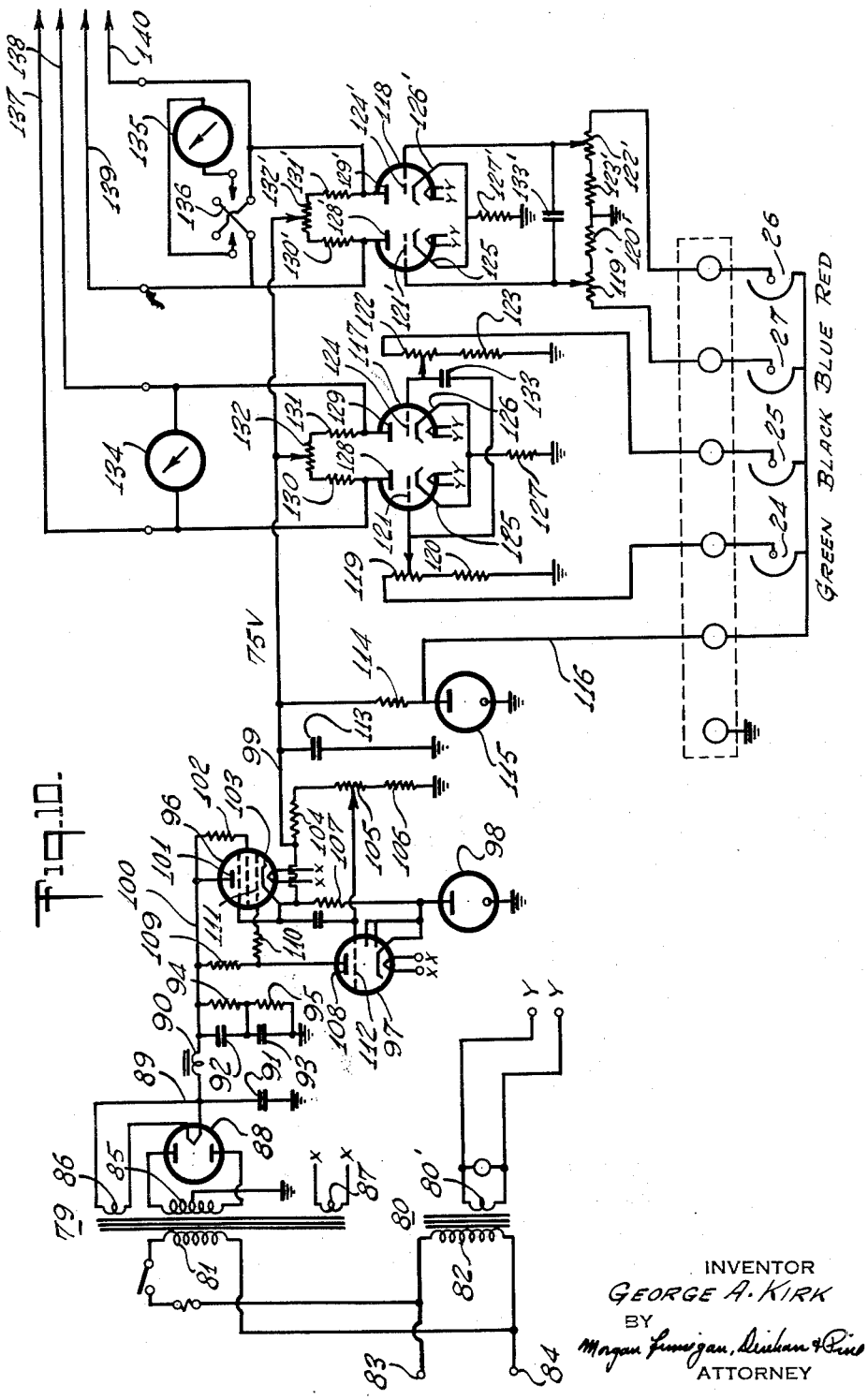

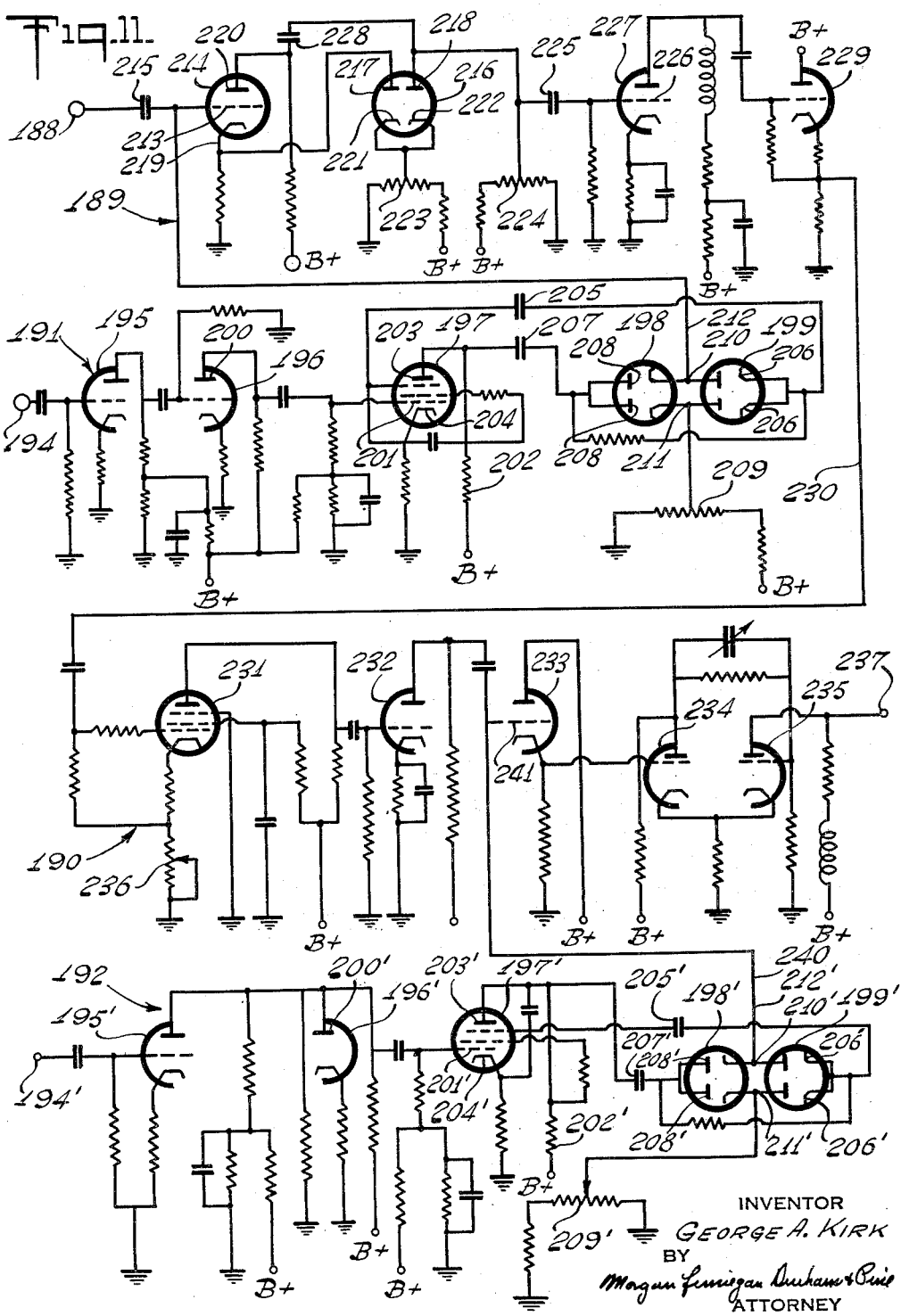

June 12, 1962  G. A. KIRK  3,039,003
METHOD AND APPARATUS FOR GRADING COTTON AND OTHER MATERIALS
Filed Nov. 3, 1960  12 Sheets-Sheet 8

INVENTOR
GEORGE A. KIRK
BY
Morgan Finnegan, Durham & Pine
ATTORNEY

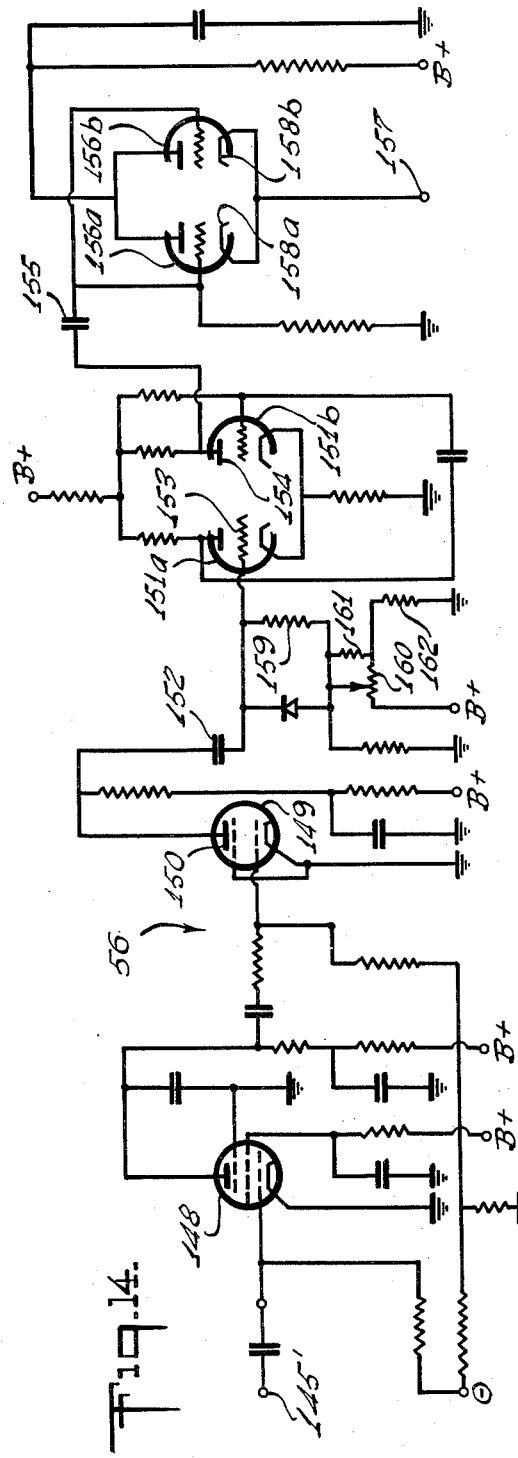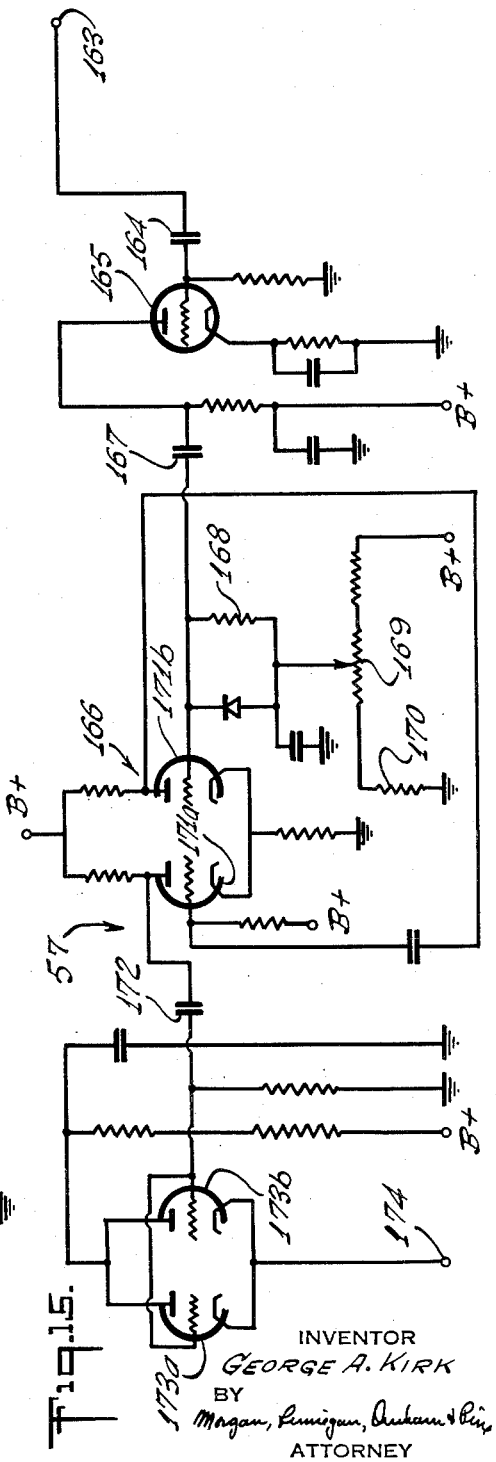

June 12, 1962
G. A. KIRK
3,039,003
METHOD AND APPARATUS FOR GRADING COTTON AND OTHER MATERIALS
Filed Nov. 3, 1960
12 Sheets-Sheet 10
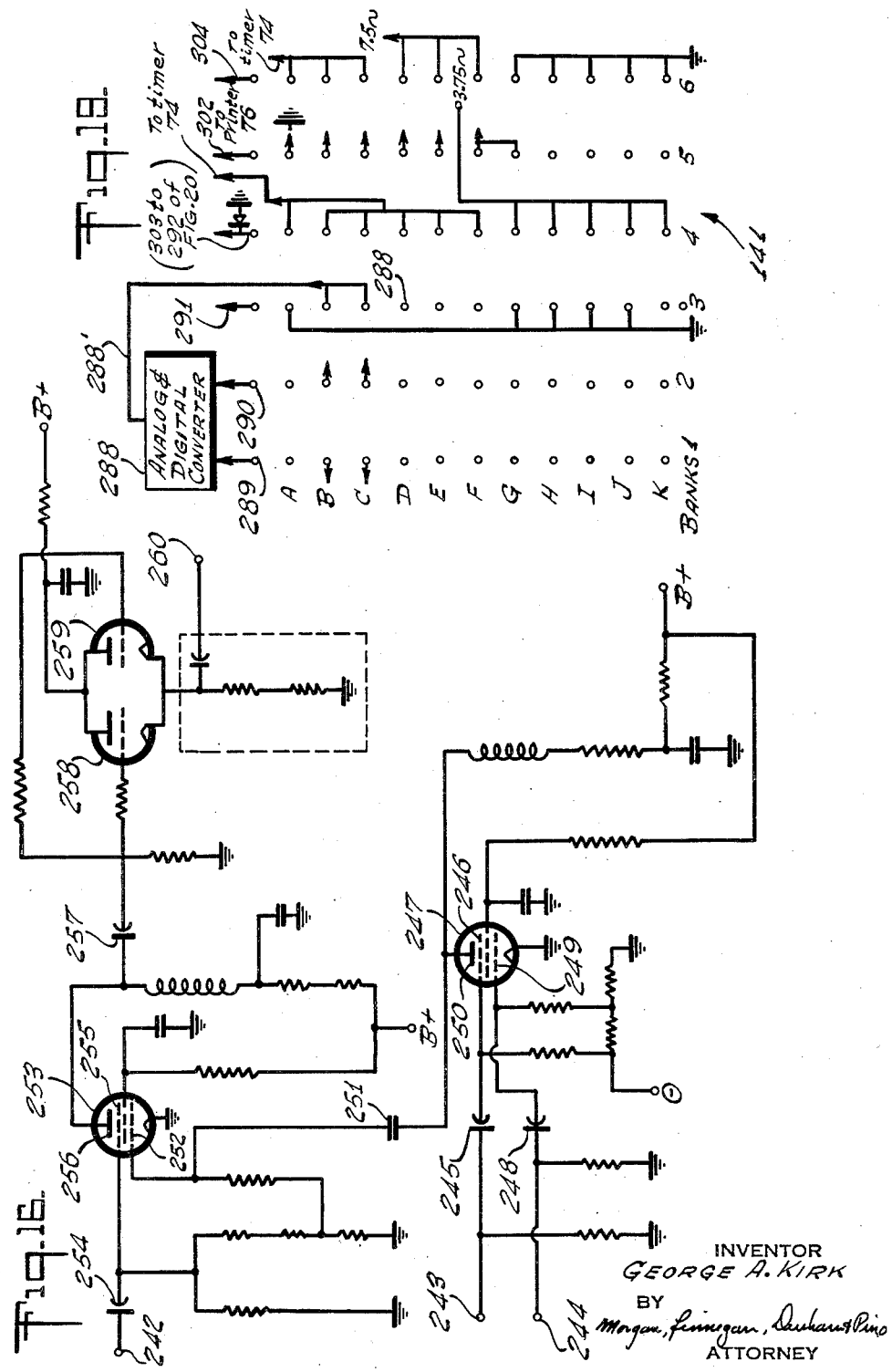
INVENTOR
GEORGE A. KIRK
BY
Morgan, Finnegan, Durham & Pino
ATTORNEY

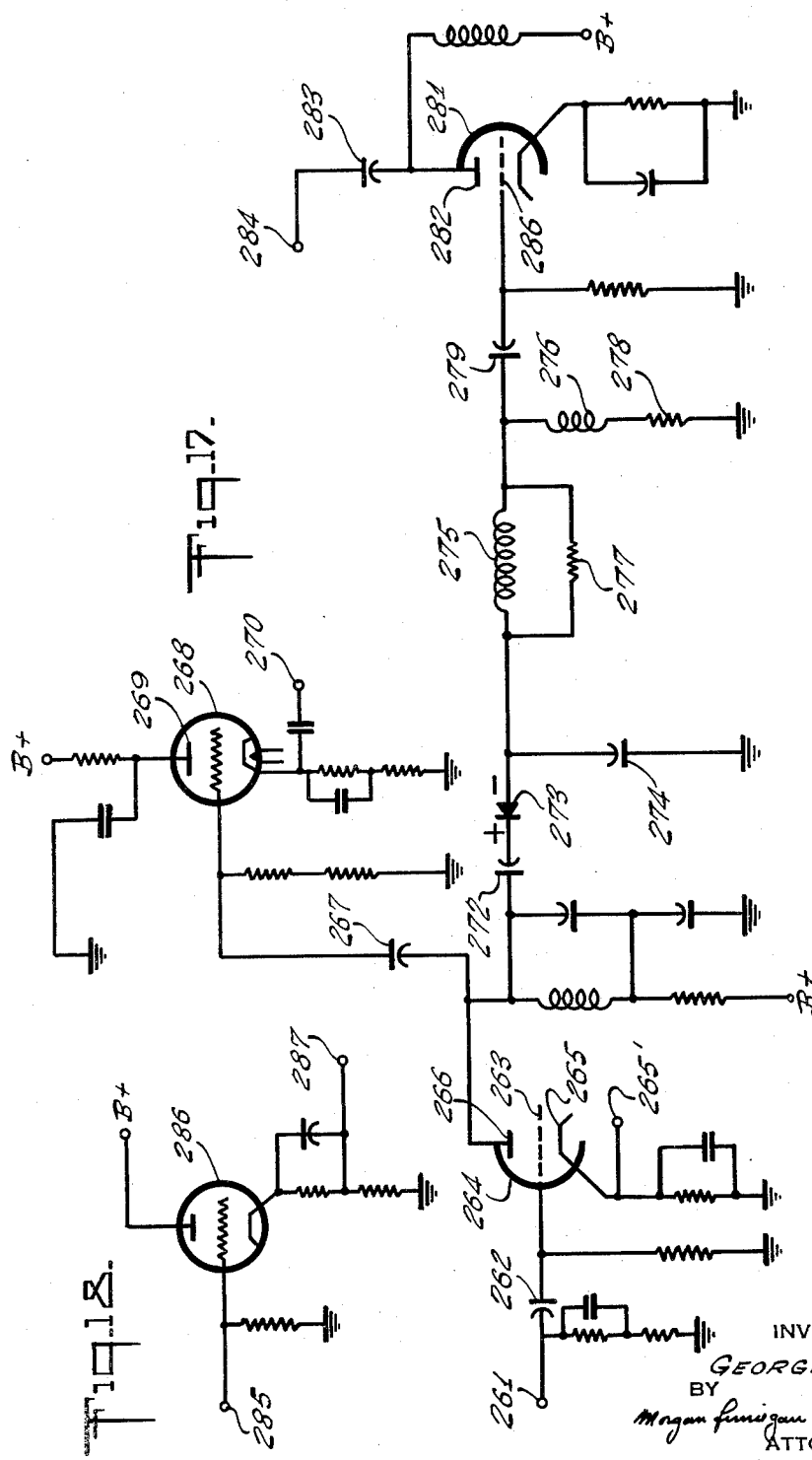

June 12, 1962  G. A. KIRK  3,039,003
METHOD AND APPARATUS FOR GRADING COTTON AND OTHER MATERIALS
Filed Nov. 3, 1960  12 Sheets-Sheet 12
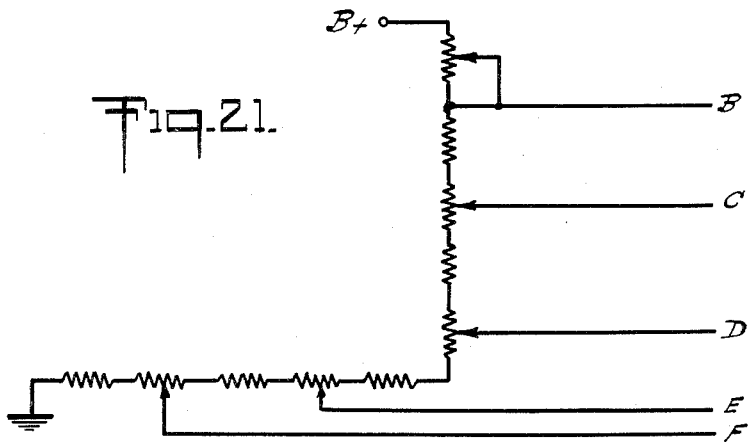
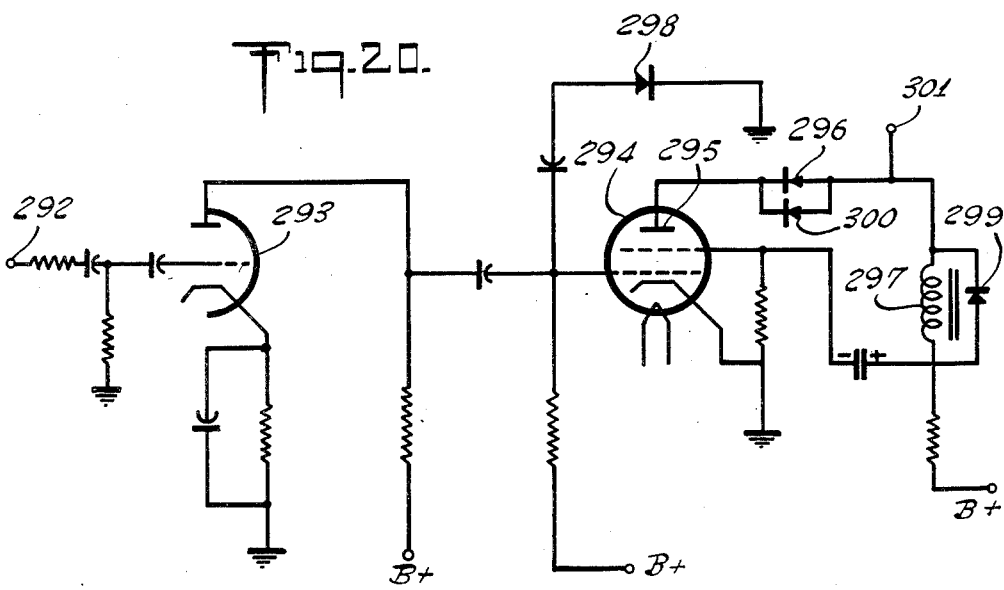
INVENTOR
GEORGE A. KIRK
BY
ATTORNEY

United States Patent Office 3,039,003
Patented June 12, 1962

3,039,003
METHOD AND APPARATUS FOR GRADING COTTON AND OTHER MATERIALS
George A. Kirk, Teaneck, N.J., assignor to United States Testing Company, Incorporated, Hoboken, N.J., a corporation of New York
Filed Nov. 3, 1960, Ser. No. 67,056
13 Claims. (Cl. 250—208)

This invention relates to the measurement of physical characteristics of materials and more specifically to an improved method and apparatus useful among other things for grading raw fibrous and other particulate products such as cotton and the like.

The objects and advantages of the invention will be set forth in part hereinafter and in part will be obvious herefrom, or may be learned by practice with the invention, the same being realized and attained by means of the parts, combinations and steps pointed out in the appended claims.

The invention consists in the novel steps, construction arrangements, combinations and improvements herein shown and described.

In the drawings:

FIG. 2 is a fragmentary cross sectional view of FIG. 1 taken along the line 2—2 thereof;

FIG. 3 is a cross sectional view of FIG. 2 taken along the line 3—3 thereof;

FIG. 4 is a plan view of FIG. 3 taken in the direction of the arrows 4—4;

Figure 1:
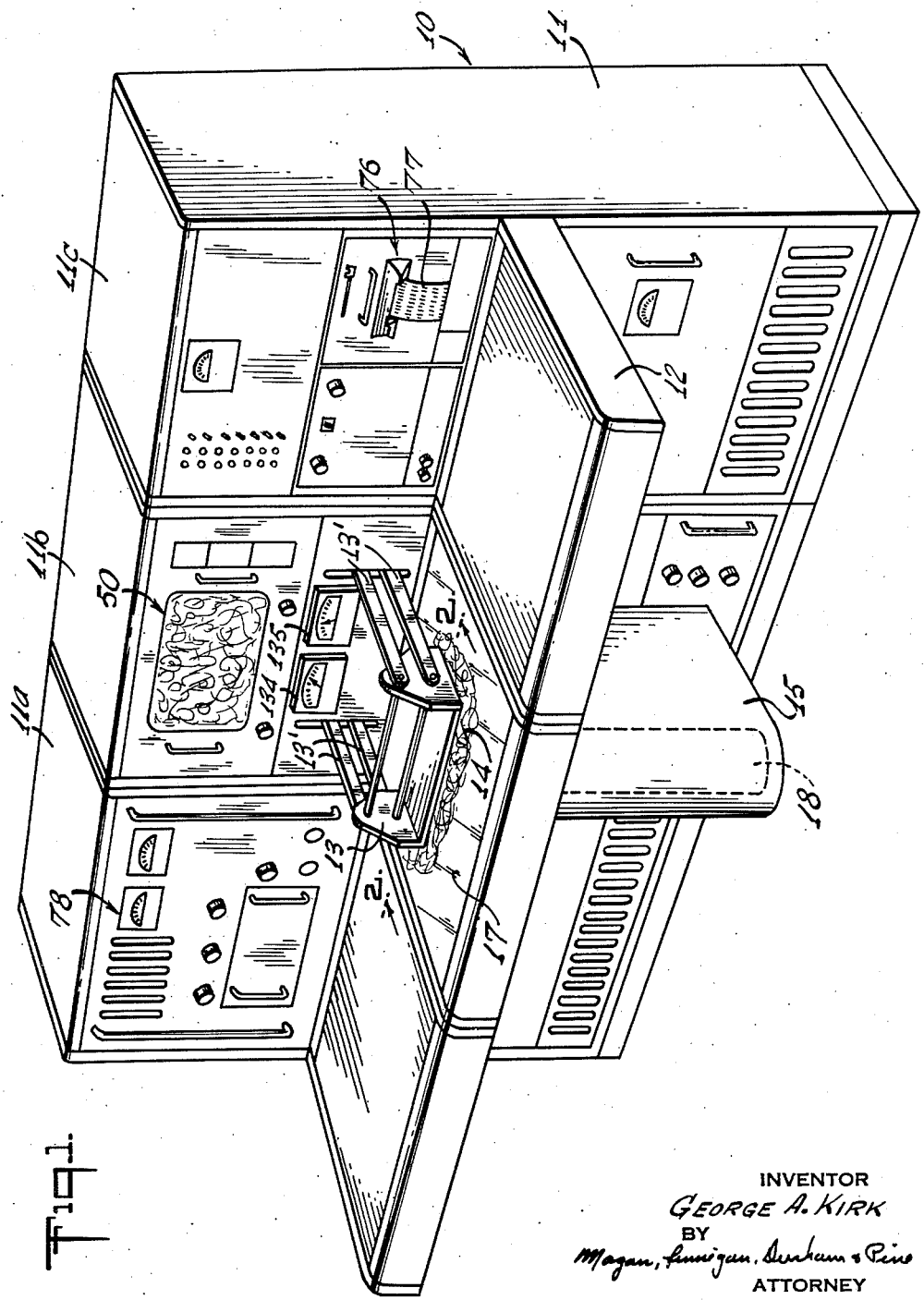
FIG. 1 is a perspective view of one embodiment of apparatus in accordance with the invention.
Figure 13:
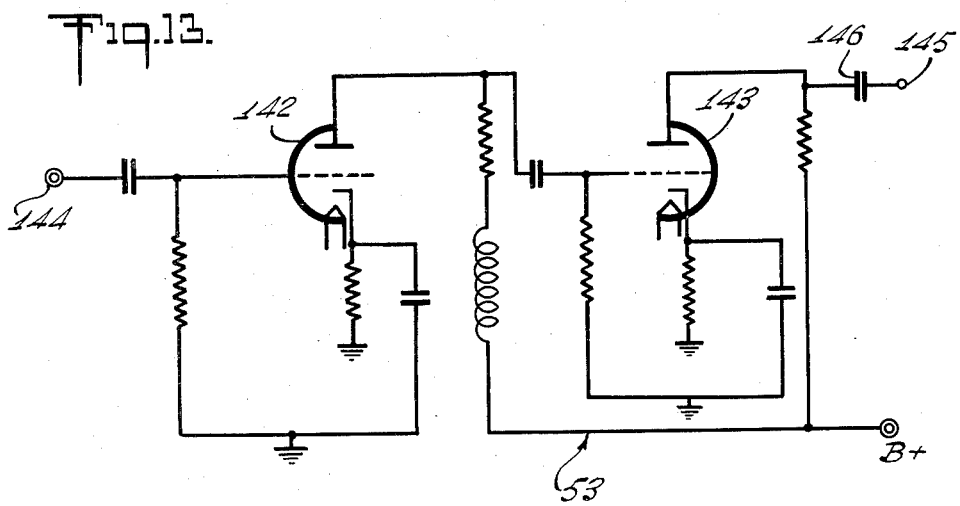
Figure 12:
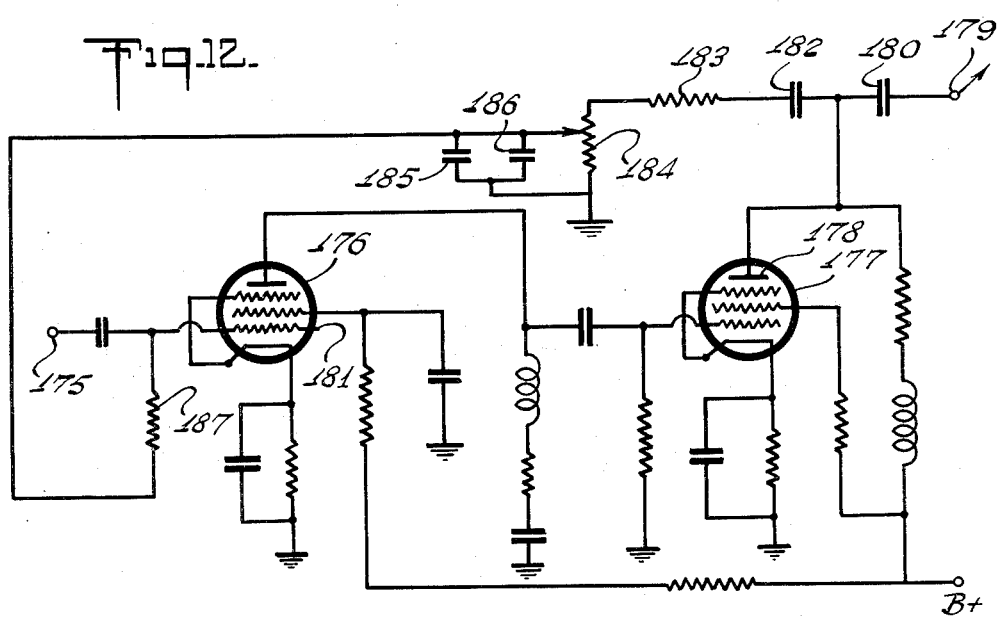

FIGS. 5 and 6 are cross sectional views of FIG. 4 taken along the lines 5—5 and 6—6, respectively;

FIG. 7 is a cross sectional view of FIG. 8 taken along the line 7—7 thereof;

FIG. 8 is a cross sectional view of FIG. 2 taken along the line 8—8 thereof;

FIG. 9 is a block diagram showing the arrangement and coordination of the electrical components forming part of the embodiment shown in FIG. 1;

FIG. 10 is a circuit diagram of apparatus for making reflectance and color measurements of the material being graded;

FIG. 11 is a circuit diagram of apparatus for measuring leaf and trash content of the material being graded and for measuring the uniformity of preparation of such material;

FIGS. 12 and 13 are circuit diagrams of video preamplifiers;

FIGS. 14 and 15 are circuit diagrams for horizontal and vertical blanking, respectively;

FIG. 16 is a circuit diagram of the gating and timing apparatus for measurement of leaf content of the material;

FIG. 17 is a circuit diagram producing information pertaining to leaf area and leaf count;

FIG. 18 is a cathode follower circuit for feeding preparation information to the selector switch;

FIG. 19 is a diagrammatic illustration of the selector switch and associated circuitry;

FIG. 20 is a circuit diagram of apparatus for operating the selector switch; and FIG. 21 is a voltage divider for actuating the printing mechanism to code the recorded measurements.

Grading of materials such as raw cotton and the like, through evaluation of physical characteristics has been carried out in the past by several methods as, for instance, visual inspection and the use of various types of scientific instruments. In cotton grading such factors as reflectance, color and leaf and trash content have been measured and one form of apparatus previously found useful is illustrated and described in U.S. Patent No. 2,228,785, entitled "Photoelectric Grading Instrument."

This invention provides an improved measuring instrument that affords a more accurate determination of certain physical characteristics of raw cotton and similar materials. It affords an improved arrangement and coordination of elements which provide a more accurate measurement of reflectance, color (off-whiteness), trash content, uniformity of preparation and the nature of the trash, all of which affect the final determination of the quality of the sample under test, though certain characteristics may be more significant than others.

It is well recognized that trash content, particularly in raw cotton, has a bearing on the grade and consequently the value of cotton. For instance, the trash may be in the form of either large or small particles distributed uniformly or non-uniformly through the material. Small particles of trash are obviously difficult to remove and generally indicate a poorer grade of material than that containing a few large pieces of trash. Consequently, prior known instruments required a visual evaluation of a cotton sample since a measurement of trash content by merely producing a signal proportional to the sum of all trash areas does not of itself provide an accurate assessment of the trash characteristics. This invention utilizes improved means which not only measures the total area of the trash content, but also provides an indication of the size of the trash particles. It has been found that these measurements afford a more precise evaluation of trash content that has been attainable by known scientific measurements and, at the same time, overcomes the human error entailed in visual inspection.

The degree of preparation of cotton is at least of equal importance as trash content and involves the measurement of the uniformity with which the fibers have been separated in the ginning process.

Another quality of a material, and particularly raw cotton, that is significant, is color. In the case of cotton this has previously been measured in terms of yellowness. It has been found that the measurement of yellowness does not afford an accurate assessment of color and a measurement of color related to a so-called "ideal white" provides a more precise evaluation of the sample. The improved measurement in accordance with the invention is referred to as "off-whiteness" and it has been shown that colors of cotton may tend either to the yellow or to the blue. This invention affords an improved method and apparatus that will measure off-whiteness and provide a numerical quantity that will identify accurately both the nature and degree of off-whiteness.

The improved apparatus in accordance with the invention further provides automatic recordation of information by sequentially sampling the several electrical measuring circuits and permits the operator of the equipment to view the surface of the sample being tested to insure proper presentation of the sample to the measuring equipment. The operator may also adjust the apparatus for wholly automatic operation or for the performance of selected measurements. In order to insure maximum precision and uniformity of operation, means are provided to permit the operator to quickly check certain critical operating voltages and operating characteristics of the equipment. In this way errors that may normally be encountered in aging of the electronic equipment, loss of illumination of light sources and the like are overcome and the circuit elements are arranged to facilitate location of any fault or inaccuracy that may occur.

Referring now to the figures and more specifically to FIG. 1, the grading apparatus in accordance with the invention is housed within a console generally denoted by the numeral 10. The vertical section 11 of the console houses the major portion of the electronic equipment for making the desired measurements and presenting the results in printed form. The horizontal desk portion 12 of the console provides working space for the operator and includes a window which lies immediately below the central weighted platen 13, the latter urging a sample of the material 14 being tested tightly against the surface of the window. The equipment, both optical and electrical which responds to selected physical characteristics of the sample being tested and produces electrical signals whcih are treated to produce the desired test information is generally housed within the shield 15 disposed beneath the table or desk 12.

Before discussing the detailed circuitry and operation of the equipment, a general discussion of the various elements forming the apparatus in accordance with the invention will afford a clearer understanding of the subject matter. The central platen 13 is carried by two pairs of parallel arms 13' and is permited to rest under the influence of gravity on the sample 14 being tested. This presses the sample 14 with a predetermined force against an underlying window. The housing 15, as will be pointed out, contains illuminating equipment for illuminating the underside of the sample 14 and includes electronic scanning means and color responsive photocells, the latter being for the purpose of determining such qualities as off-whiteness and reflectivity of the sample. The scanning means affords detailed information of the character of the sample, namely, its degree of preparation, the amount of trash that may be contained therein and the general nature of the trash, whether it be in fairly large pieces or in a plurality of small pieces.

The lefthand portion 11a of the console contains electronic timing and counting equipment and a number of controls for the purpose of effecting manual or automatic operation of the equipment, the cyclic rate at which the equipment will make the several measurements when operated automatically and various control switches for the operation of the equipment. The central section 11b of the console contains a cathode ray tube monitor, meters for indicating reflectance and off-whiteness characteristics of the sample and controls for the operation of the scanning and monitoring equipment. The third or right hand section 11c of the console includes a control panel, frequency monitoring means and a computor for converting analog information to digital information, a digital printer and certain power supplies for operation of the equipment.

In operation of this console, the central platen 13 would normally be in a raised position and it is desirable to energize the equipment far enough in advance of the performance of actual tests in order to enable all of the electronic circuits to become heat stabilized. The sample is then placed beneath the platen and a platen motor is energized which will lower the platen into position and urge the sample against the window. If automatic readings are to be made, the equipment may be adjusted accordingly, whereupon a signal is applied to initiate the start of the operation. The equipment will then successively register on the digital recorder or printer information relating to reflectance of the sample, color, degree of preparation of the sample, total leaf area and leaf count. When the readings are completed, the machine automatically indexes itself to the starting position in preparation for the testing or inspection of the next sample.

A block diagram showing the several electronic units utilized to attain the desired ends is shown in FIG. 9 and a number of the individual blocks in this diagram carry figure numbers relating to subsequent figures of the drawings which illustrate in detail the electronic circuitry forming that portion of the equipment represented by the block. Certain of the electronic circuits utilized with this invention, however, are well known and a detailed description is not deemed necessary.

The optical and photoelectric equipment which responds to optical characteristics of the sample and generates the initial electrical signals is illustrated in detail in FIGS. 2 through 8, inclusive.

Referring now to these figures, the table top 12 includes a central window generally denoted by the numeral 16 which in the illustrated embodiment of the invention is essentially 4" by 5" and the top side of the window is covered by a sheet of glass 17. Immediately beneath the window there is disposed a photoelectric camera 18 having a lens system 19 which focuses light reflected from the sample overlying the window 16 on to the sensitive face of the image tube contained within the camera 18. The operation of a photoelectric camera such as the camera 18 is well known in the art, and specific details are not believed essential for an understand of its operation. The various voltages required for operation of the camera are fed through a cable 19 and this cable may also include electric conductors for conducting the output signals to the electronic components within the console 10.

Inasmuch as the light utilized to illuminate the sample under test must be carefully controlled, a substantially light proof housing 20 encloses the under side of the window 17 and contains four incandescent lamps 21 carried in cooperating sockets 22, the latter being mounted on an annular plate 23 within the housing 20. The lamps 21 are energized by a carefully controlled D.C. source in order to prevent generation of a ripple or hum in the equipment and secondly, to insure the maintenance of uniform illumination over extended periods of time.

The photocells 24, 25, 26 and 27 for measuring color and reflectance of the sample are also carried within the housing 20 and are shielded against direct illumination from the lamps 21 by an essentially rectangular shield 28 carried by the annular plate 23. The shield or plate 28 extends upwardly a distance sufficient to block all rays from the lamps that would directly impinge on the photocells. Each photocell 24 through 27 is carried in a holder 29 and the latter is adapted to be engaged and supported by a cooperating socket 29' mounted in the bottom 20' of the shield 20. The photocells are spaced from the center of the shield 28 to provide a central opening 29 for the transmission of light from the sample through the lens system 19 of the camera and onto the sensitive face of the camera as shown in FIG. 2. The lens 19 of the camera is arranged so that it will scan the complete 4 by 5 window 16 for determining such characteristics as the degree of preparation of the sample and its leaf and trash content. The manner in which the photocells 24 through 27 are connected to produce electrical signals corresponding to color and reflectance will be described in detail in connection with FIG. 10 of the drawings.

In the instant embodiment of the invention reflectance of a sample is determined by measuring a resultant voltage produced by two of the four photocells, namely, 24 and 25. Vacuum photocells will draw current even when the cathode and anode elements are in total darkness. This occurs by reason of molecular agitation in the cathode and this current, which is called "dark" current, will vary with ambient temperature. In order to obtain an accurate reading of reflectance and cancel the photocell dark current, one of the photocells, namely 25, is provided with a black or opaque filter 25' while the other photocell 24 is covered by a green filter 24' such as a Kodak Wratten green filter No. 50. The photocell 24 may also include an adjustable iris for calibrating the equipment to compensate, at least approximately, for differences in sensitivities of different photocells.

The photocells 26 and 27 are utilized for measuring off-whiteness of the sample. It has been found that the off-whiteness characteristic may tend either toward the red portion of the spectrum or toward the blue portion of the spectrum and that the nature of the off-whiteness characteristic can be accurately determined by providing the photocell 26 with a red filter 26', as for instance a Kodak Wratten red filter No. 25 and the photocell 27 with a blue filter 27' such as the Kodak Wratten blue filter No. 47. Under these conditions the photocells 26 and 27 will respond to red and blue light reflected from the sample. As the outputs of these cells are balanced one against the other, the dark currents are automatically cancelled and the signals representing red and blue lights will also cancel so that the resultant signal will be of one polarity for blue and another polarity for red. With a given indicating meter it has been found that the difficulties involved in the attainment of good reproducible values when at or near its zero scale position can be overcome by biasing the indicating circuit so that when the red and blue signals are substantially equal, a predetermined voltage or current will be recorded. Should the signals become unbalanced, the meter or other indicator will read a figure greater or less than the arbitrary zero. This will be discussed in detail in connection with FIG. 10 of the drawings.

The mechanism for controlling the operation of the platen 13 is shown in detail in FIGS. 3 through 6 of the drawings. In these figures it will be observed that the lower arms 13' are carried by an elongated shaft 30 rotatably carried by supporting members 31 and 32. The upper arms 13' are pivotally secured to stub shafts 33 carried by the supporting members 31 and 32. Movement of the platen toward and away from the window 17 is effected by a drive motor 34 which operates through a speed reduction unit 35, spur gears 36 and 37 and a shaft 38 to drive an eccentric cam 39. The shaft 30 includes a rearwardly extending arm 40 having on its outer end a cam follower 41 which rides on the surface of the cam 39. In this way, as the cam 39 moves in a counterclockwise direction, the platen 13 will be lowered until it contacts the sample 14. When the cam is operated it will move until the depression 39' in the cam 39 is aligned with the follower 41. At this point the cam will move out of contact with the follower 41 so that gravity alone will hold the platen against the sample. After the readings have been completed in accordance with the invention, the motor 34 is again operated and the cam moves in the counterclockwise direction to lift the platen to the position shown in dotted outline in FIG. 3, whereupon the motor will automatically stop and hold the platen in the elevated position. Operation of the motor to stop in predetermined positions is accomplished by appropriate switches 42 and 43 which are actuated by a cam member 44 carried by the shaft 38. This cam member may form part of the cam 39 or may comprise an independent unit. The circuitry required for controlling the operation of the motor by switches 42 and 43 and cooperating manually operated push buttons is well known in the art and further description is not deemed necessary. The cam 44 together with suitable switch means may also function to automatically initiate the testing process after the platen is in the lowered position.

The essential components of the electrical circuitry in accordance with the invention are shown in block form in FIG. 9 with the blocks connected by single lines to show the relationship of the circuit elements one to the others. The electronic scanning camera is denoted by the numeral 18 and the monitor which displays an image of the sample under test as viewed by the camera is denoted by the numeral 50. Both the monitor 50 and the camera 18 are energized by a source of A.C. current preferably of 60 cycle frequency, though it is evident that the equipment may be designed for operation on any type of power supply. In addition, the camera is connected to the monitor through a cable 51 for the transmission of the video signal as well as the essential timing pulses to effect synchronization of the scanning beams in both the monitor as well as the camera. The video signal produced from the camera is fed through the lead 52 and is treated in a number of ways to obtain information concerning the degree of preparation of the sample and trash content and size of the trash particles.

More specifically, the video signal is fed to three video amplifiers denoted by the numerals 53, 54 and 55. The amplifier 53 is shown in FIG. 13 and merely increases the level of the video signal. This amplified signal is applied to the horizontal blanking circuit 56 which is shown in FIG. 14. This blanking circuit extracts the horizontal blanking signals from the video signal which signal is then fed to the electronic gate 58 illustrated in detail in FIG. 16 of the drawings. Horizontal blanking signals are those signals which are generated in the electronic image recording and reproducing equipment for the purpose of interrupting the operation of the electronic beam during retracing periods and thereby prevent the reproduction of lines caused by beam retrace for the purpose of starting a new scan. In addition to the application of the horizontal blanking pulses to the gate 58, a timing frequency of 4.032 mcs. is produced in a frequency generator 59 and is also fed to the gate 58. The resultant output from the gate 58 by way of the lead 60 will contain 4 mcs. signal except during the horizontal blanking time and this signal is fed to a leaf chassis 61 also shown in detail in FIG. 16 of the drawings.

The vertical blanking circuit 57, shown in detail in FIG. 15, is for the purpose of eliminating artifacts or noise which occurs at the start of each vertical scan. This noise, if not removed, would be counted by the apparatus as trash and result in an inaccurate analysis of the material under test. To avoid this difficulty the vertical blanking signal is generated by feeding the vertical driving pulses from the video camera 18 through lead 52' to the blanking generator 57. This circuit through multivibrator action produces the vertical blanking signal which is fed to the selector circuit 65.

A second portion of the video signal produced by the camera 18 is fed through the second amplifier 54 illustrated in FIG. 12 of the drawings and is then fed to a clamping circuit 62 along with a 15.75 kilocycle pulse, with each pulse being roughly ten microseconds in duration. These pulses are in effect keying pulses and are utilized to treat the video pulse from the amplifier 54 to produce an output video signal on the lead 63 for application to the leaf chassis 61. The output signal on lead 63 has substantially all noise and white-going information eliminated thus leaving only the black-going information which is presented in square waves of substantially equal amplitude. The leaf chassis 61 receives signals from the gate 58 and the clamped amplifier 62 and produces an output in the lead 64 in terms of 4.032 mcs. signal bursts of uniform amplitude. Thus, as the scanning beam of the camera 18 traverses successive lines on the image of the sample focused on the sensitive screen of the camera, the dark objects on that line will actuate the electronic circuits to permit the 4 mcs. signal to be presented at the output of the leaf chassis 61 only during the time the beam scans such dark objects. The 4 mcs. signal is blanked out during retrace of the beam and also during periods when black information is not present. Thus the black information represents the trash particles that may be in the sample and the 4 mcs. signal will provide a measure of the time duration of each piece of black-going information.

The output of the leaf separator chassis 61 is then fed to a selector chassis 65 (see FIG. 17). The vertical blanking signal from the blanking circuit 57 is also fed to the selector chassis or selector circuit and interrupts the operation of the selector circuits during the presence of the vertical timing signal and therefore in the absence of such vertical signal, a 4 mcs. signal is fed through the lead 66 to a cathode follower output amplifier 67 also illustrated in FIG. 17. The output of this amplifier carries trash information and upon counting the cycles of the 4 mcs. signal appearing at this amplifier, a total trash area can be computed. Counting is accomplished by the counter 78 interconnected with the printer 76 and shown in FIGS. 1 and 9.

A portion of the selector circuit output signal is also fed through a lead 66' to a demodulator 68, also illustrated in FIG. 17. This demodulator rectifies the bursts of 4 mcs. energy to produce D.C. pulses with each pulse having a time duration corresponding to a total continuous burst of such 4 mcs. energy and the output of the demodulator 68 represents trash count which is utilized in estimating the size of the trash particles in the sample being tested.

Information pertaining to the degree of preparation of the sample is also obtained from the video signal, the latter being fed to the amplifier 55 which is represented by the circuit shown in FIG. 12. The output of the amplifier 55 is then fed to the preparation amplifier 69 which is similar to the amplifier shown in FIG. 11 except that it is adjusted to present white-going information rather than black-going information. Its output is fed to a preparation amplifier 70 and then to the cathode follower 71 which is shown in FIG. 18 of the drawings.

Thus far, there have been developed three separate signals from the video information, namely, leaf count which appears on the output lead 67' from the cathode follower 67, leaf area information presented on the lead 68' from the demodulator 68, and preparation information on the lead 71' from the cathode follower 71. This information is then fed to the selector switch 72 which, as will be shown, sequentially feeds the information to the counter 78 and printing mechanism 76.

The selector switch is represented by the block 72 and will be discussed more fully in connection with FIG. 19 of the drawings. The mechanism for actuating the switch 72 is represented by the block 73 and is shown in detail in FIG. 20 of the drawings. The switch actuating circuit 73 is operated at certain times by pulses produced in the timer 74 which forms part of the counting device 78 and at other times by an oscillator 74'. The timing pulses for actuation of the selector switch are essential as the several measurements require different time intervals and it is necessary that the switch be in position to transmit signals to the counter during predetermined periods. For instance, when measuring the number of trash particles, it is important that they be counted only during a single scan of the field.

In addition to the information fed to the selector switch from the camera 18 as described above, signals corresponding to color and reflectance of the sample under test is also fed to the selector switch. The apparatus for making the color and reflectance measurements is denoted in FIG. 9 by the box 75 and the details of this apparatus will be described in connection with FIG. 10.

The selector switch functions to actuate the printer 76 to feed the paper 77 as successive readings are transmitted to the printer. The electrical signals corresponding to color, reflectance, trash count, trash area and degree of preparation are all in the form of different frequencies which are counted by counter 78 and then to the printer 76 so that numerical figures representing the various measured quantities will be printed on the paper 77. The measurement of the characteristics of the sample under test can be carried out either manually or automatically. In manual operation the operator may select any particular reading for recordation by the printer, or he may arrange to operate the apparatus automatically so that the readings of various characteristics are successively printed on the paper 77. In this instance, when the apparatus has completed an entire cycle, it will automatically stop and reset itself for the next operation.

*Off-Whiteness and Reflectance Measurements*

As previously pointed out, color and reflectance measurements are made by a series of photocells 24 through 26 which are preferably of the photoemissive vacuum type. In the measurement of reflectance, the currents produced by the cells 24 and 25 are connected to produce a resultant signal corresponding to the difference between the signals of the two cells. The cell 24, as previously mentioned, includes a green filter, while the cell 25 has an opaque enclosure. In this way, the dark current, which is normally uniform in the cells, will be cancelled and the only signal appearing at the output will be proportional to the light activating the cell 24.

In the case of the cells 26 and 27 which are utilized for the measurement of color, they, too, are connected so that the resultant signal will correspond to the difference between the signals of the two cells. In this case the dark currents will again cancel. In addition, the resultant signals produced on the cells 26 and 27, which represent red and blue light, respectively, will also tend to cancel. If we assume that a condition wherein equal amounts of red and blue light affect the respective photocells 26 and 27 and adjust the circuitry so that an assumed reading of 10 is obtained, then it follows that the reading will be modified in one direction if the proportion of red light falling on the cell 26 exceeds the blue light falling on the cell 27, and vice versa.

The circuits have been arranged so that the indicator will read an increased value when the red light is predominant. It has been found that this procedure will afford a measurement of whiteness, or, more accurately stated, off-whiteness, since it is possible to place a neutral white plaque over the window 17 and adjust the equipment for the assumed zero reading. After so doing, it is found that as the proportion of the red and blue light is changed, the measurement will vary in one direction or the other, indicating a degree of off-whiteness toward the reds and oranges in one case or a degree of off-whiteness toward the greens and blues. In the trade, the color of cotton is normally referred to as "the degree of yellowness." The measurement of yellowness of cotton, however, is not a true measure of color as it has been found that cotton samples may vary from those having a predominant blue cast to those having a material degree of yellowness. Thus, the more precise definition of the color measurement of cotton in accordance with this invention is one of off-whiteness rather than yellowness.

The circuitry for attaining the reflectance and color measurements includes a power transformer 79 and a filament transformer 80 with the primary windings 81 and 82, respectively, being connected in parallel to the terminals 83 and 84. Since precise measurements are to be made by this apparatus, it is desirable to apply a regulated alternating current to the terminals 83 and 84 so that the electronic circuitry will also function in a uniform manner. The transformer 79 includes a high voltage secondary 85 and a pair of filament windings 86 and 87. The windings 85 and 86 are connected with a full wave rectifier tube 88 in the conventional manner and the resultant rectified voltage appearing on the lead 89 is filtered by an inductance and capacitance filter comprising a choke 90 and condensers 91, 92 and 93. Resistors 94 and 95 connected across the series condensers 92 and 93 merely act as voltage dividers to insure application of substantially equal voltage across each of the condensers 92 and 93.

The tubes 96 and 97 together with a voltage regulator 98 are utilized to further regulate the D.C. supply voltage ultimately appearing on the lead 99. Circuits of this nature are well known and in this instance, the filtered voltage on lead 100 is fed to the plate 101 and the screen grid 102 of the tube 96. The cathode 103 of the tube 96 is connected to ground through a series of resistors 104, 105, 106, as well as through a resistor 107 and the voltage regulator tube 98. The output voltage on the lead 99 is taken directly from the cathode 103 of the tube 96.

The tube 97 is essentially a triode amplifier and has its plate 108 connected to the midpoint of resistors 109 and 110 connected between the lead 100 and the grid 111 of the tube 96. The grid 112 of the tube 97 is connected to an adjustable contactor on the resistor 105 which provides a positive bias for the tube 97.

Should the voltage on the lead 99 tend to fall below a value determined by the adjustment of the contactor on resistor 105, the tube 97 will draw less current, with the result that the bias on the grid 111 of tube 96 will become more positive. As a consequence, the tube will draw more current and the voltage on the lead 99 will increase. A reverse action occurs should the voltage on the lead 99 suddenly increase. The time constants of the circuit are arranged so that the control is effective to minimize fluctuations caused by A.C. The output voltage on the lead 99 is bypassed to ground by a condenser 113 and a voltage divider comprising resistor 114 and a voltage regulator tube 115 is utilized to provide a constant voltage on the lead 116 for energizing the cathodes of the photocells 24 through 27.

Two dual triode tubes 117 and 118 are utilized for the purpose of comparing and amplifying the output voltages produced by the pairs of photocells 24, 25, 26 and 27. The filaments of these tubes, denoted by the letters Y—Y are connected to the secondary 80' of the transformer 80 and it will also be observed that the filaments of the tubes 96 and 97, denoted by the letters X—X are heated by the winding 87 of the transformer 79.

Referring now to the dual triode 117, it will be observed that an anode of the photocell 24 is connected through a voltage divider comprising a potentiometer 119 and a resistor 120 to ground. The contactor of the potentiometer 119 is fed to the grid 121. The anode of the photocell 25 is connected through a potentiometer 122 and resistor 123 to ground and the contactor of the potentiometer 122 is connected to the grid 124 of the tube 117. The cathodes 125 and 126 of the tube 117 are connected together and to ground through a resistor 127 to provide cathode bias for the tube. The plates 128 and 129 are connected through resistors 130 and 131 to a balancing resistor 132, the latter having its movable contactor connected to the lead 99. In addition, it will be observed that the grids 121 and 124 of the tube 117 are coupled by a stabilizing condenser 133.

From the foregoing description it will be observed that as the current in the photocells 24 and 25 vary in accordance with the light that may impinge thereon, the signal on the associated grids will vary accordingly and modify the plate currents in the resistors 130 and 131. As a consequence, the potentials at the plates 128 and 129 will vary proportionally to the currents. Since it is desired to measure the difference in potential between the plates 128 and 129 for determining reflectance, an indicating meter 134, preferably of a high internal resistance is connected directly between the plates 128 and 129. This meter is mounted on the panel 11b as shown in FIGURE 1. In adjusting the equipment for a reflectance reading, it will be observed that the photocell 25 is normally shielded so that it will not receive any light whatsoever. By similarly shielding the green photocell 24 and setting potentiometers 119 and 122 at minimum signal positions, the contactor on the balancing potentiometer 132 can be adjusted to attain uniform plate currents in each of the triode sections. The potentiometer 119 can then be adjusted at a midway point in order to provide latitude in adjusting the sensitivity of the system. The potentiometer 122 is then adjusted to balance any difference in the gains of the circuits associated with the photocells 24 and 25 and thereby balance out dark currents. By shorting the grids 121 and 124 while photocell 24 is shielded the potentiometer 132 may be again adjusted for balance. Photocell 24 is then uncovered and the sensitivity of the system is checked by a standard plaque placed over the window. Should a change in sensitivity be required, the balancing procedure may be repeated to insure proper balance of the tubes and cancellation of dark currents.

The off-whiteness measurement is accomplished by the photocells 26 and 27 in connection with the dual triode amplifier tube 118. This circuit is substantially similar to the circuit utilized for reflectance and like primed numbers have been utilized to denote corresponding elements of the circuit. In the adjustment of the circuit, however, both photocells 26 and 27 are covered in order to balance the two sections of the tube 118 and produce a zero reading on the meter 135. As in the case with the reflectance circuit, potentiometer 132' is adjusted to substantially balance the plate currents in the two sections of the tube 118. Thereafter the potentiometers 119' and 122' are adjusted so that by the placement of white, black or neutral plaques over the window, the reading on the meter 135 will not shift more than one percent from an arbitrary reading greater than zero. A double-pole, double-throw switch 136 is connected in the meter circuit and is usually positioned so that under normal circumstances an increase in yellowness or red cast of the sample will increase the reading on the meter 135, while an increase in the blue cast of the sample will cause a decrease in the meter reading. Under certain circumstances, however, where blue dyed samples of other fibers are to be examined, the switch 136 can be operated to reverse the meter 135 so that an up-scale reading on the meter will indicate a greater degree of blueness. This will provide increased latitude in measurement of the blue color of the sample.

As previously pointed out, the apparatus in accordance with the invention affords means for making a permanent record of the various readings and accordingly the leads 137 and 138 which carry the reflectance signal are connected to terminals B of banks 1 and 2 of the selector switch shown in FIG. 19. Similarly, the leads 139 and 140 which carry the off-whiteness signal are connected to the terminals C of banks 1 and 2 of the selector switch. This selector switch is generally denoted by the numeral 141, and forms part of the block 72 shown in FIG. 9.

*Measurement of Trash Area and Trash Count*

As previously described an image receiving camera 18 is utilized to scan the illuminated sample when the latter is placed over the window 17 and is held in position by the weight of the platen 13. An image of the scanned material appears on the monitor 50. Since this apparatus is well known in the art, a detailed description of its construction and operation is not deemed necessary. Signals generated in the camera 18, however, are utilized for making the desired measurements and will now be described.

The video signal produced by the camera and fed to the monitor 50 is also fed through the lead 52 to a video amplifier 53 as shown in detail in FIG. 13. This amplifier is of conventional construction utilizing a pair of amplifier tubes 142 and 143 that are resistance-capacity coupled and provided with cathode bias in the conventional manner. The signal on lead 52 is applied to the input terminal of the amplifier 144 and the amplified output signal is obtained at the terminal 145 which terminal is connected to the plate of the tube 143 through the condenser 146. The amplified video signal is then fed to the horizontal blanking amplifier 56 which is illustrated in FIG. 14.

Referring now to FIG. 14, the signal from terminal 145 of FIG. 13 is applied to the terminal 145' of FIG. 14 and this signal is amplified by grounded cathode pentode amplifiers 148 and 149, the grids of these tubes being polarized by a fixed negative bias. Since these amplifying stages are of conventional configuration, a detailed description is not considered necessary. It is significant, however, that the circuits are adjusted so that the stripped horizontal blanking pulses appear at the anode 150 of the tube 149 and these pulses are fed to a one-shot multivibrator circuit utilizing a dual triode consisting of triodes 151a and 151b. The signal from the plate 150 is fed through condenser 152 to the grid 153. As each horizontal blanking pulse appears on the grid 153, an output signal will appear on the plate 154 of the tube 151b and this signal is fed through the condenser 155 to a pair of triodes 156a and 156b connected in parallel as a cathode follower output. The output blanking signal appears at the terminal 157 which is connected with the cathodes 158a and 158b. The return circuit for the cathodes 158a and 158b to ground is accomplished through a load circuit in the apparatus to which the terminal 157 is connected. This enables the utilization of a coaxial cable for the transmission of the signals and at the same time minimizes capacitive effects of the cable.

In order to secure a sharp blanking pulse for actuation of the multivibrator stage as previously described, the output signal from the tube 149 is differentiated by means of the condenser 152 and the resistors 159 and 160, 161 and 162. The differentiation of this signal provides a very sharp pulse to obtain a high degree of accuracy in the time of actuation of the multivibrator. In addition, it is necessary in the operation of this circuit to be able to adjust the duration of the pulse produced by the multivibrator and for this purpose the potentiometer 160 is provided. The importance of the adjustment of the time duration or delay of this blanking pulse will become evident from the following description of the leaf chassis 61 and the selector chassis 65.

The vertical blanking circuit 57 which is illustrated in FIG. 15 is somewhat similar to the horizontal blanking circuit except that the former is actuated directly from the vertical driving pulse generated in the video camera 18. This driving pulse is fed to the input terminal 163 and through a condenser 164 to a triode amplifier 165. The amplifier tube 165 is connected in a conventional manner and is fed to the multivibrator stage generally denoted by the numeral 166 through a coupling condenser 167. This coupling condenser, together with the resistors 168, 169 and 170 form a differentiation circuit that produces a sharp pulse for actuation of the one-shot multivibrator 166. This multi-vibrator includes a pair of triode tubes 171a and 171b and its output is fed through a condenser 172 to two triode tubes 173a and 173b which are connected in parallel and form cathode follower output with the output signal appearing at the terminal 174. This cathode follower output operates in substantially the same manner as the cathode follower shown and described in connection with FIG. 14.

To order to synchronize the operation of the vertical blanking pulses with the commencement of the vertical sweep in the camera 18, the resistor 169, in the form of a potentiometer, is adjustable to modify the duration of the delay in the operation of the multi-vibrator 166 and thus enable the elimination of all noise or artifacts that may occur just prior to the initiation of the vertical sweep.

Referring again to FIG. 9, it will be observed that the horizontal blanking or delay signal from the block 56 is fed to a gating circuit denoted by the block 58 and thence to the leaf amplifier 61. The gating circuit and leaf are shown in detail in FIG. 16. However, inasmuch as the leaf amplifier 61 receives a video signal through the video amplifier 54 and the clamping amplifier 62, these circuits will now be described.

The video amplifier 54 is shown in FIG. 12 and the video input from camera 18 is fed to the terminal 175 via the lead 52. This preamplifier includes a pair of pentodes 176 and 177 which are connected as cathode biased amplifiers. The output signal is obtained from the plate 178 of the tube 177 and is fed to the output terminal 179 through a coupling condenser 180. A feedback circuit from the plate 178 to the grid 181 of the tube 176 and comprising a condenser 182, resistor 183, potentiometer 184, condensers 185 and 186 and a resistor 187 provide automatic gain control for the circuit as well as the ground return for the grid 181. It will be observed that automatic gain control is desirable in this instance, as it is important to remove white-going information in the clamped amplifier 62 and leave only black-going information of uniform amplitude for presentation to the leaf amplifier 61.

The output terminal 179 of the amplifier shown in FIG. 12 is fed to the input terminal 188 of the clamped amplifier as illustrated in FIG. 11. The clamped amplifier is formed of two amplifier sections denoted for convenience by the numerals 189 and 190, while the clamping circuits are generally denoted by the numerals 191 and 192. A horizontal blanking signal is obtained from the camera 18 via the lead 193 (see FIG. 9), and is fed to the input terminal 194 of the clamping circuit 191. This circuit includes amplifier tubes 195, 196, 197, 198 and 199. The horizontal blanking pulses which in the present embodiment of the invention have a frequency of 15.75 kc. and a duration of approximately 10 microseconds, are amplified by the triode amplifiers 195 and 196. The amplified signal appears at the plate 200 of the tube 196, and feeds the grid 201 of the tube 197, the latter being biased so that the plate current of the tube 197 which flows through the plate resistor 202 will swing between cutoff and saturation. The positive going pulses which appear on the cathode 204 of the tube 197 are fed through a condenser 205 to the cathodes 206 of the rectifier 199. The negative going pulses are obtained from the plate 203 of the tube 197 and are fed through the condenser 207 to the plates 208 of the rectifier 198.

With this arrangement the tubes 198 and 199 conduct heavily during the ten microsecond duration of the blanking pulse and apply a preset voltage, determined by the setting of the potentiometers 209, to the grid 213, of the amplifier tube 214 via the lead 212.

Referring now to the amplifier 189 in which the video signal is fed to the grid 213 via a coupling condenser 215, the clamped video signal under control of the clamping circuit 191 is fed to the rectifier 216. It will be observed that the rectifier 216 consists of two diodes in which the plates 217 and 218 are connected respectively to the cathode 219 and plate 220 of the tube 214. The cathodes 221 and 222 of the tube 216 are biased by the potentiometer 223, while one of the plates 218 is biased by the potentiometer 224. With this arrangement, let it be assumed that the voltage entering the grid 213 of the tube 214 has a 12 volt peak-to-peak amplitude and that it is clamped at 20 volts. The positive or white-going signals would be at plus 20 volts, while the black-going signals would be at approximately plus 8 volts. Now, if potentiometer 223 is set at plus 10 volts, conduction will not take place until a signal greater than plus 10 volts appears on the plate 217. Thus, two volts of the signal will be clipped from the black-going portion. A potentiometer 224 is interconnected with the plate 218 and serves to bias the plate 218 of the tube 216. By proper adjustment of the potentiometer 224, the white-going information will also be clipped to remove it completely. In this way, the resultant signal fed through the condenser 225 to grid 226 of tube 227 can be adjusted to vary from .25 volt to .5 volt so that the total peak-to-peak signal would be approximately .25 volt with all noise and white-going information eliminated. The condenser 228 connected between the plate 220 of tube 213 and the plate 218 of tube 216 is for the purpose of neutralizing any differentiated pulses that may appear in the output of the clipped signal resulting from inter-electrode capacity of the tube 216.

The signal is then amplified and inverted by the tube 227, and fed through a conventional cathode follower stage including the tube 229. The output signal is then fed by a lead 230 to the second section of the amplifier 190 comprising tubes 231, 232, 233, 234 and 235. The tubes 231 and 232 are conventional voltage amplifiers and tubes 231 includes a potentiometer 236 which functions as a gain control. The tube 233 is a conventional cathode follower stage, while the tubes 234 and 235 are directly coupled to insure that the video signal appearing at the output terminal 237 will be essentially a square wave and that all of the black-going information will be of equal amplitude. In this way, the only variations in the signal will be in terms of time. It will be observed, before leaving the circuit of FIG. 11, that the second clamp 192 is substantially identical to the clamp 191 and like primed numbers have been applied which correspond to elements of the circuit 191. The output of this clamp is connected by means of the lead 240 to the grid 241 of the cathode follower 233 and functions to interrupt the black-going information when the tubes 198' and 199' conduct heavily.

The black-going information now presented at the output terminal 237 of the circuit shown in FIG. 11 is fed to the input terminal 242 of the circuit shown in FIG. 16 (this circuit being represented by the blocks 58 and 61 of FIG. 9). In addition to the clamped video signal, the horizontal blanking signal appearing at the terminal 157 of FIG. 14 is connected to the terminal 243 of FIG. 16 while a timing signal is applied to the terminal 244. The timing signal in the instant embodiment of the invention is 4.032 megacycles and is obtained from the frequency generator denoted by the numeral 59 in FIG. 9. This generator may be of any desired form, though it is important that it constitute a stable source of frequency, since this frequency is used for the purpose of measuring certain aspects of trash area found in the sample under test.

The horizontal blanking signals are fed through the coupling condenser 245 to one grid 246 of a multigrid tube 247. The 4 megacycle timing signal on terminal 244 is simultaneously fed through a coupling condenser 248 to grid 249. Since the tube 247 is connected essentially as an amplifier, with the control grids 246 and 249 negatively biased, the 4 megacycle signal will appear on the plate 250 of tube 247 only during the absence of the horizontal blanking signals. This 4 megacycle signal is fed through the condenser 251 to grid 252 of the tube 253. At the same time, the signal from the terminal 242 is fed through a condenser 254 to the grid 255 of tube 253. The tube 253 operates in effect as a gate under the control of the black-going pulses fed to the grid 255. During the presence of a black-going or leaf pulse, the tube 253 is permitted to conduct and, at that time, a burst of the 4 megacycle signal will appear at the plate 256. This signal is fed through a coupling condenser 257 to a cathode follower stage having tubes 258 and 259. The successive burst of 4 megacycle frequency corresponding to the black-going information will then appear at the output terminal 260.

The bursts of 4 magacycle frequencies which appear at the terminal 260 of FIG. 16 are fed to the input terminal 261 of FIG. 17. This signal is coupled by a condenser 262 to the grid 263 of tube 264. The tube 264 is connected as a conventional amplifier with the plate circuit resonant at essentially 4 magacycle frequency. A vertical blanking signal from the terminal 174 of FIG. 15 is fed to the cathode 265 of tube 264 via the terminal 265'. This blanking signal operates to gate the tube for the purpose of easing any artifacts that may develop or be produced by the camera 18 at the start of the vertical sweep. The plate 266 of the tube 264 is fed through a condenser 267 to the grid 268 of the tube 269. The tube 269 is connected as a cathode follower so that the resultant output signal appears at the terminal 270. The signal appearing at the terminal 270 constitutes bursts of the 4 megacycle frequency which represent the black-going signals produced by the trash measured in the sample. It is evident that if the number of cycles of this frequency are counted, the resultant figure will provide a measurement of the total trash area in the sample. In the instant embodiment of the invention this signal appearing on the terminal 270 is fed to contact E, bank 3, of the selector switch illustrated in FIG. 19. In the operation of this selector switch the signal is fed to counting means and thence to the printer as previously described.

The measurement of leaf area is also accomplished by the circuit of FIG. 17. It will be observed that the signal on the plate 266 of tube 264 is fed through a condenser 272 and a rectifier 273. The rectified signal is then passed through a filter network comprising a condenser 274, chokes 275 and 276, resistors 277 and 278. The filtered signal then goes through a second coupling condenser 279 to the grid 280 of the tube 281. The output signal appearing at the plate 282 is fed through a coupling condenser 283 to the output terminal 284. Inasmuch as the signal appearing at the terminal 284 is rectified by the rectifier 273 and appropriately filtered, the 4 megacycle bursts will not be present but rather, there will appear a series of pulses in the form of envelopes defined by the 4 megacycle bursts but with the 4 megacycle signal removed. By counting the number of envelopes, each of which represents a burst of 4 megacycle frequency, the total number of such envelopes counted during a single scan will afford an indication of the character of the trash in the sample. For example, if the trash consists of one large leaf rather than a plurality of small particles of equivalent total areas, the leaf count will be relatively small, since a single large particle is being scanned. However, let it be assumed that instead of a single, relatively large piece of trash, that there are a plurality of minute pieces of trash. It may be that the area of these minute pieces of trash may equal the area of a single leaf, but because of the relatively small, numerous particles of trash, the leaf count figure will be considerably higher and will indicate a lower grade of cotton than if the trash count were small with the same area count.

The output trash count signal appearing at the terminal 284 is fed to contact F, bank 3 of the selector switch shown in FIG. 19.

The term "preparation that will be used in the following description relates to the degree to which the cotton has been processed prior to the tests. As is well known cotton, after it has been picked, is ginned to remove the trash. In ginning cotton the fibers of the cotton are combed so that the longer the ginning process, the more uniform will be the resultant cotton sample. It has been found that if there are groups of fibers of cotton which are tightly packed, they will reflect more light than loosely packed fibers. As a result, it has been found possible to measure the degree of preparation of cotton by utilizing white-going information obtained by the camera 18. For this purpose a system somewhat similar to the electronic equipment utilized for the measurement of trash is employed and consequently, a detailed description of the electronic circuitry is not deemed necessary. It is to be understood that the measurement of preparation is at least as important as the measurement of trash as above described for convenience in the preparation of this description, however, the trash circuits were described before the preparation circuits.

As previously pointed out, the circuits for the measurement of preparation as denoted in FIG. 9 by the blocks 55, 69, 70 and 71. The block 55 constitutes an amplifier which is substantially the same as the amplifier shown and described in connection with FIG. 12. This amplifier merely amplifies the video signal brought out of the camera 18 by means of the lead 52 and, as in the case with the amplifier 54 of FIG. 9, includes an automatic gain control to insure uniformity of the output signal. If desired, the amplifiers 54 and 55 of FIG. 9 could be eliminated and a single amplifier utilized in their place to feed both the clamped amplifier 62 and the preparation amplifier 69.

Preparation amplifier 69 is substantially identical to the amplifier shown and described in connection with FIG. 11 and receives input signals corresponding to the amplified video signal together with 10 microsecond, 15.75 kcs. pulses. It will be recalled that in the description of the amplifier of FIG. 11, that black-going information was provided on the output terminal 237 and this was effected by selectively clipping the video signal. It is evident from that description that by properly biasing the circuits, that white-going information can be obtained. This white-going information would represent variations in brightness of the sample and thus afford an indication of the preparation of the sample. The output signal from the clamped amplifier 69 is fed to the preparation amplifier 70 which, in this instance, may merely constitute a conventional amplifying circuit for increasing the level of the signal. The output is then fed to a cathode follower 71 (FIG. 9) illustrated in FIG. 18. More specifically the preparation signal from the block 70 of FIG. 9 is fed to the input terminal 285 of the circuit shown in this figure. A single triode 286 is utilized in this embodiment of the invention and the output signal appearing at terminal 287 is applied to the contact D, bank 3 of the selector switch 141 of FIG. 19.

The circuitry thus far described covers the measurement of five different qualities of the sample being tested, namely, color or off-whiteness, reflectance, trash area, trash count and preparation, and all of these signals are fed to the selector switch 141.

*Selector Switch and Associated Circuitry*

The selector switch 141 contains a total of six banks of contacts numbered 1 through 6, inclusive, with each bank containing 11 contacts lettered A through K, inclusive. Banks 1 and 2 merely provide for the transfer of reflectance and off-whiteness information to the printer 76. Since the off-whiteness and reflectance information is provided in terms of a voltage, the moving contactors 289 and 290 of the selector switch are connected to an analog and digital converter 288 (FIG. 19). The converted information which is now in terms of frequency, is applied via lead 288' to contacts B and C of bank 3. The signals are then fed via the moving contactor 291 to the counter 78 and thence to the printer 76.

The preparation, trash area and trash count information fed to contacts D, E and F, respectively, of bank No. 3 are successively fed via the moving contactor 291 to the counter represented by block 78 of FIG. 9. These measurements can be successively presented to the counter since the information is in the form of discrete pulses and the number of pulses experienced during a single or a given number of scans of the sample will afford the desired information. It is important in the presentation of the various measurements to the counter 78 that the selector switch be operated in proper time sequence to avoid presentation of duplicate information.

While the selector switch may be of any desired configuration, the switch in accordance with this embodiment of the invention constitutes an electromagnetic device and is operated by the circuit shown in FIG. 20. In this figure the input terminal 292 receives predetermined pulses from the timing device represented by the block 74 and the oscillator represented by block 74' of FIG. 9. These pulses are amplified by the tube 293 and are fed to a thyratron 294. The plate 295 of the thyratron is fed through an interrupter contact 296 on the selector switch and through the coil 297 which actuates the selector switch. Contact 296 is open when the selector switch is in the position shown in FIG. 20 and is moved to the closed position when the selector switch is actuated and the moving contactors are in engagement with the banks of contacts 1 to 6 inclusive. The rectifiers 298 and 299 are utilized to prevent reverse surges in the circuits. The rectifier 300 is connected across the interrupting contacts 296 to reduce sparking. Terminal 301 is interconnected with a cam switch operated by a motor 34 which controls the platen 13 so that upon actuation of the motor to lower the platen, contact 301 is momentarily grounded to operate the selector switch and cause the moving contacts of each bank to engage contact A of each bank. In so doing, the movable contactor 291 is shifted to contact A of bank 3 and functions to ground the counting device 78 of FIG. 9 to clear it of any residual information. At the same time, the moving contactor 302 of bank 5 is grounded through contact A of that bank and, as contactor 302 is connected to the printer 76, it energizes the printer to print a numeral indicating that the counter is clear. At the same time, one second timing signals connected to contacts A, B, and C of bank 6 are applied to the timing device 74 through contact 304 of bank 6. Upon the expiration of one second, which has been selected as a satisfactory timing rate, an index pulse is fed by the timing device 74 to contacts A through F of bank 4 which feeds a signal via contact A of bank 4 and moving contactor 303 to terminal 292 of the stepping switch amplifier in FIG. 20. Note that contacts A through F of bank 4 are all connected in parallel and to the timer for the purpose of applying indexing pulses to the selector switch operating mechanism. The stepping switch is now on position B, whereupon reflectance information is fed from terminals B of banks 1 and 2 to the analog-to-digital converter 288, counter 78, and then to the printer 76. The moving contactor 302 now engages contact B of bank 5 and applies a voltage to the printer 76 which will cause it to print a numeral 1 along with the reflectance information in order to identify such reflectance information. Contacts B, C, D, E, F and G of bank 5 are supplied with different voltages to cause the counter to print numerals corresponding to information fed to the printer from such selected positions. The voltages for these contacts of bank 5 may be obtained in any suitable manner, as by means of the voltage divider shown in FIG. 21. The voltage divider merely comprises a plurality of resistors and the several voltage positions are indicated by the letters B through F, which correspond to the contacts B through F of bank 5 on the switch of FIG. 19. After the elapse of 1 second, a pulse is again applied to the contact 303 and causes the stepping switch to step the contacts C. This presents off-whiteness information through the contacts 289 and 290 to the analog-to-digital converter 288. The digital information is then fed to contact C of bank 3, thence through the contact 291 to the counter 78 of FIG. 9 which, in turn, feeds a signal to the printer 76. When the switch is again actuated to move the movable contacts to the fixed contacts D of the switch, the preparation signal is fed directly through the counter 78 to the printer and subsequent operations will feed trash area and trash count signals successively to the counter. In the case of steps A, B and C, of bank 6. When the stepping switch is on position D, however, a 7.50 cycle signal is applied through contactor D of bank 6, and the moving contactor 304 to the timing device 74. This applies a 133 millisecond print command to the timing device to cause the switch to move to the next step E at the end of that period of time. Step E provides for the recordation of trash area. In this case a 7.5 cycle signal is again fed to the timing device 74 so that the switch will remain for approximately 133 milliseconds to provide the trash area information. The switch is then stepped to bank F for trash count. Since the 7.5 cycle frequency is also fed to contact F bank 6, the switch will be moved to the next step after 133 milliseconds. As all readings have now been completed, a 3.75 cycle signal is fed directly to contacts G through K of bank 4, will cause the stepping switch to step ahead automatically until it returns to the off position, as illustrated in FIG. 9. Manual operation may be effected by providing suitable controls for actuation of the stepping switch 141 directly or through the timing device in cases where the readings are to be conducted for predetermined time periods.

The production of the 3.75 and 7.50 cycle signals may be accomplished in any desired manner, and oscillators for this purpose are well known. In the instant embodiment of the invention, the frequency generated by the oscillator 74' is controlled by the 60 cycle pulse frequency of the camera 18 and this insures synchronization of the counter with the scanning system of the camera 18. For instance, in the case of the off-whiteness and reflectance measurements, the cycles of the frequency produced in each case would be counter for a predetermined period controlled by the pulse fed to contacts B and C of bank 6. When the reading is completed the counter automatically gives a command to the switch to cause it to index to the next step and at the same time provide a print command to the printer which records the count and clears the counter. The 7.5 cycle timing pulses cause the counter to count preparation, leaf area and leaf count pulses.

From the foregoing description, it is evident that numerous additional control features may be provided which, for simplicity, have not been described in detail. For instance, means may be provided for recording a selected function, for resetting the equipment at any time or for the attainment of manual operation. It is also desirable that appropriate instruments be provided to indicate significant voltages and frequencies so that the operator can be assured the equipment is functioning properly at all times. Appropriate adjustments are also made available to the operator for the control of the camera 18 and monitor 50, as, for instance, the camera gain, target and beam controls and monitor brightness and contrast controls. These features are well known in the art and accordingly description is not believed necessary.

While only one embodiment of the invention has been illustrated and described, it is apparent that modifications, changes and alterations may be made without departing from the true scope and spirit thereof.

What is claimed is:

1. Grading apparatus for material comprising a transparent window for reception of a sample of said material to be tested, means urging said sample against said window with a predetermined pressure, illuminating means beneath said window for illuminating said sample, at least four light responsive photocells beneath said window, individual amplifiers connected with said photocells, said photocells being arranged in pairs with one cell of one pair being responsive to light reflected from the sample and the other cell of said one pair being shielded from light, connections between the amplifiers associated with said one pair of cells to produce a resultant voltage corresponding to the difference between the output voltages of the last said amplifiers, the other of said pairs of photocells being arranged with essentially red and blue filters to respond respectively to red and blue components of light reflected from said illuminated sample, connections between the output of the amplifiers associated with said other pair of photocells to produce a voltage equal to the algebraic sum of a constant voltage and the difference between the output voltages of the last said amplifiers, an image receiving tube beneath said window and means for focusing an image of said sample on said tube, said image receiving tube scanning said image to produce voltages corresponding to the variations in brightness of said image, electronic means responsive to said image pulses representing light areas of said sample and producing a signal proportional to the area of said sample that is lighter than the general background, electronic means responsive to image pulses representing dark areas of said sample and producing a signal proportional to the number of areas of said sample that are darker than the background, electronic means including an oscillator responsive to said dark area image pulses to produce a burst of oscillator signals during the presence of each dark area pulse, means for counting the total number of cycles of said oscillator to produce a signal proportional to the total area of the image that is darker than background, and means for sequentially recording said voltages and signals to provide an indication of the physical characteristics of said sample.

2. Grading apparatus according to claim 1, including means responsive to said voltages and signals to produce numerical figures proportional to such voltages and signals, said recording means recording said numerical figures.

3. In grading apparatus for materials, means for measuring color and reflectance characteristics of said material comprising an opaque surface having a transparent window therein, means for holding a sample of said material in overlying relationship to one side of said window, an opaque housing enclosing the other side of said window, means within said housing for illuminating the sample substantially uniformly throughout its area, a first photoemissive cell within said housing, said cell being shielded from direct light emitted by said illuminating means and responsive light reflected from the illuminated surface of said sample, a first amplifier connected with said first cell for amplifying the signal produced by said cell in response to light reflected thereon and producing an output voltage, a second photoemissive cell and second amplifier associated therewith, the last said cell including an opaque shield whereupon the output voltage of said second amplifier is proportional to the dark current of said second cell, means for substantially equalizing the gains of said first and second amplifiers, interconnections between said amplifiers to produce a resultant voltage equal to the difference between said amplifier voltages, third and fourth photoemissive cells within said housing and with said third cell having a filter discriminating against short wavelengths of the spectrum and said fourth cell having a filter discriminating against the long wavelengths of the spectrum, amplifiers connected with said third and fourth cells to produce voltages proportional to the signals produced by the last said cells in response to the impingement of selected light wavelengths thereon, and interconnections between said amplifiers associated with said third and fourth photocells to produce a single resultant voltage corresponding to the difference between voltages produced by the last said amplifiers.

4. In grading apparatus for materials, means for measuring color and reflectance characteristics of said material comprising an opaque surface having a transparent window therein, means for holding a sample of said material in overlying relationship to one side of said window, an opaque housing enclosing the other side of said window, means within said housing for illuminating the sample substantially uniformly throughout its area, a first photoemissive cell within said housing, said cell being shielded from direct light emitted by said illuminating means and responsive light reflected from the illuminated surface of said sample, a first amplifier connected with said first cell for amplifying the signal produced by said cell in response to light reflected thereon and producing an output voltage, a second photoemissive cell and second amplifier associated therewith, the last said cell including an opaque shield whereupon the output voltage of said second amplifier is proportional to the dark current of said second cell, means for substantially equalizing the gains of said first and second amplifiers, interconnections between said amplifiers to produce a resultant voltage equal to the difference between said amplifier voltages, third and fourth photoemissive cells within said housing and with said third cell having a filter discriminating against short wavelengths of the spectrum and said fourth cell having a filter discriminating against the long wavelengths of the spectrum, amplifiers connected with said third and fourth cells to produce voltages proportional to the signals produced by the last said cells in response to the impingement of selected light wavelengths thereon, and means biasing the last said resultant voltage to produce a voltage of predetermined magnitude when the voltages of the last said amplifiers are of equal but opposite magnitudes.

5. Apparatus for grading material comprising carrier surface having a transparent window therein for receiving a sample of said material to be graded in overlying relationship, a platen, means for moving said platen toward and away from said window, said platen upon movement toward said window exerting a predetermined pressure on said sample, means beneath said window for illuminating the face of the sample overlying said window, first photoelectric image scanning means scanning said sample, means connected with said scanning means to produce signals corresponding to the number of light areas, the number of dark areas and the magnitude of the dark areas, second photoelectric means for producing a signal corresponding to the general reflectivity of said sample, third photoelectric means responsive to light reflected from said sample and producing a signal corresponding to the proportion of long light wavelengths to the short light wavelengths, recording means, sequence switching means connected with said recording and photoelectric means for sequentially feeding said signals to said recorder and means interconnected with said platen moving means and said selector switch to permit operation of said switch when said platen is in pressure engagement with said sample.

6. Apparatus according to claim 5 including pulse generating timing means interconnected with the first said photoelectric means, and means for electrically counting the timing pulses during the presence of dark area signals.

7. Apparatus according to claim 5 including a voltage to frequency converter connected with said second and third photoelectric means to produce alternating signals the frequency of which correspond to the magnitude of the signals produced thereby and means for counting said alternating signals to produce a numerical quantity corresponding to reflectance and wavelength proportion.

8. In apparatus for grading material comprising means illuminating said sample, first photoelectric image scanning means scanning said sample, means connected with said scanning means to produce signals corresponding to the number of bright areas, the number of dark areas and the magnitude of the dark areas, second photoelectric means for producing a signal corresponding to the general reflectivity of said sample, third photoelectric means responsive to light reflected from said sample and producing a signal corresponding to the proportion of long light wavelengths to the short light wavelengths, recording means, sequence switching means connected with said recording and photoelectric means for sequentially feeding said signals to said recorder and means interconnected with said platen moving means and said selector switch to permit operation of said switch when said platen is in pressure engagement with said sample.

9. In apparatus for grading material, photoelectric means scanning said material to produce signals corresponding to the light and dark areas of said material, means for amplifying said signals, a clamped amplifier for removing signals representing dark areas, means for biasing the last said amplifier for removing signals representing light areas and having a magnitude below a predetermined level and counting the number of light area signals during at least one scan of the material, said number being an indication of the uniformity of the light reflecting characteristic of said material.

10. In apparatus for grading material, photoelectric means scanning said material to produce signals corresponding to the light and dark areas thereof, means for amplifying said signals, a clamped amplifier for removing signals representing dark areas, means for biasing the last said amplifier to remove signals representing dark areas and having a magnitude below a predetermined level, a timing pulse generator, an electronic gate including means for feeding said timing pulses and said dark area signals to provide a resultant signal comprising bursts of timing pulses with the length of each burst corresponding to the duration of a dark area signal pulse, means for counting the total number of timing pulses during at least one complete scan of said material, means for rectifying said bursts of timing pulses to produce demodulated envelopes of said bursts with said envelopes having uniform amplitude and then counting said envelopes during at least one complete scan of said material.

11. In apparatus for grading material, photoelectric means scanning said material to produce signals corresponding to the light and dark areas of said material, means for amplifying said signals, a clamped amplifier for removing signals representing dark areas, means for biasing the last said amplifier for removing signals representing light areas and having a magnitude below a predetermined level, counting the number of light area signals during at least one scan of the material, said number being an indication of the uniformity of the light reflecting characteristic of said material, a second clamped amplifier interconnected with the first said amplifier for removing signals representing dark areas, means for biasing the last said amplifier to remove signals representing dark areas and having a magnitude below a predetermined level, a timing pulse generator, an electronic gate including means for feeding said timing pulses and said dark area signals to provide a resultant signal comprising bursts of timing pulses with the length of each burst corresponding to the duration of a dark area signal pulse, means for counting the total number of timing pulses during at least one complete scan of said material, means for rectifying said bursts of timing pulses to produce demodulated envelopes of said bursts with said envelopes having uniform amplitude and then counting said envelopes during at least one complete scan of said material.

12. The method of grading material comprising the steps of scanning an illuminated surface of said material along a predetermined path and producing resultant signal pulses, selecting a background range of brightness, filtering said signal pulses to remove all pulses representing dark areas and background, counting the number of pulses to provide a numerical indication of bright areas of said material, again filtering said first signal pulses to remove all pulses representing light areas of the material and background, producing bursts of timing pulses with each burst having a time duration corresponding to the time duration of one dark area pulse, counting the total number of timing pulses during at least one complete scan of the material, demodulating said bursts of timing pulses and then counting the number of demodulated pulses.

13. The method of grading material comprising the steps of illuminating a surface of the material being graded, detecting the average light reflected by said surface, detecting the long wavelength and short wavelength light rays reflected by said surface and producing signals proportional thereto, combining the last said signals to produce a difference signal indicating the relative proportions of the reflected long and short light wavelengths, scanning said illuminated surface along a predetermined path and producing resultant signal pulses, selecting a background range of brightness, filtering said signal pulses to remove all pulses representing dark areas and background, counting the number of pulses to provide a numerical indication of bright areas of said material, again filtering said first signal pulses to remove all pulses representing light areas of the material and background, producing bursts of timing pulses with each burst having a time duration corresponding to the time duration of one dark area pulse, counting the total number of timing pulses during at least one complete scan of the material, demodulating said bursts of timing pulses and then counting the number of demodulated pulses.

References Cited in the file of this patent

UNITED STATES PATENTS

| | | |
|---|---|---|
| 2,267,319 | Benning | Dec. 23, 1941 |
| 2,907,887 | Beck | Oct. 6, 1959 |